(12) United States Patent
Lin et al.

(10) Patent No.: US 10,199,943 B2
(45) Date of Patent: Feb. 5, 2019

(54) SYSTEMS AND METHODS FOR VOLTAGE REGULATION OF PRIMARY SIDE REGULATED POWER CONVERSION SYSTEMS WITH COMPENSATION MECHANISMS

(71) Applicant: ON-BRIGHT ELECTRONICS (SHANGHAI) CO., LTD., Shanghai (CN)

(72) Inventors: Yuan Lin, Shanghai (CN); Zhiqiang Sun, Shanghai (CN); Weihua Wang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/588,399

(22) Filed: May 5, 2017

(65) Prior Publication Data

US 2017/0279362 A1    Sep. 28, 2017

Related U.S. Application Data

(63) Continuation of application No. 14/604,819, filed on Jan. 26, 2015, now Pat. No. 9,692,306.

(30) Foreign Application Priority Data

Dec. 24, 2014  (CN) .......................... 2014 1 0838058

(51) Int. Cl.
*H02M 3/335* (2006.01)
*H02M 3/325* (2006.01)

(52) U.S. Cl.
CPC ... *H02M 3/33507* (2013.01); *H02M 3/33569* (2013.01); *H02M 3/325* (2013.01); *H02M 3/335* (2013.01)

(58) Field of Classification Search
CPC .......................... H02M 3/33507; H02M 1/08
See application file for complete search history.

(56) References Cited

U.S. PATENT DOCUMENTS 3,870,943 A    3/1975  Weischedel et al.
7,615,974 B1   11/2009 Xu
(Continued)

FOREIGN PATENT DOCUMENTS

| CN | 103781257 A | 5/2014 |
|---|---|---|
| CN | 104617792 B | 12/2017 |
| TW | 201101666 | 1/2011 |

OTHER PUBLICATIONS

Taiwan Intellectual Property Office, Office Action dated Nov. 23, 2015, in Application No. 104107199.
(Continued)

*Primary Examiner* — Emily P Pham
(74) *Attorney, Agent, or Firm* — Faegre Baker Daniels LLP

(57) ABSTRACT

Systems and methods are provided for voltage regulation of power conversion systems. An example system controller includes: a first sampling component configured to sample a sensing signal and determine a compensation signal based on at least in part on the sensing signal, the sensing signal being associated with a first current flowing through a primary winding of a power conversion system; a signal processing component configured to receive a feedback signal and the compensation signal and generate a first signal based at least in part on the feedback signal and the compensation signal, the feedback signal being associated with an auxiliary winding coupled with a secondary winding of the power conversion system; an error amplifier configured to receive the first signal and a reference signal and
(Continued)

generate an amplified signal based at least in part on the first signal and the reference signal.

39 Claims, 15 Drawing Sheets

(56) References Cited

U.S. PATENT DOCUMENTS

| | | | |
|---|---|---|---|
| 7,990,202 | B2 | 8/2011 | Fang et al. |
| 8,493,098 | B1 | 7/2013 | Tousignant |
| 9,083,245 | B2 | 7/2015 | Zhao et al. |
| 9,692,306 | B2 | 6/2017 | Lin et al. |
| 9,825,533 | B2 | 11/2017 | Lin et al. |
| 2011/0044076 | A1* | 2/2011 | Zhang ............... H02M 3/33507 363/21.17 |
| 2012/0075891 | A1* | 3/2012 | Zhang ............... H02M 3/33523 363/21.18 |
| 2012/0300508 | A1 | 11/2012 | Fang et al. |
| 2013/0033905 | A1 | 2/2013 | Lin et al. |
| 2013/0223107 | A1* | 8/2013 | Zhang ............... H02M 3/33523 363/21.16 |
| 2014/0078790 | A1* | 3/2014 | Lin ................... H02M 3/33507 363/21.16 |
| 2016/0190935 | A1 | 6/2016 | Lin et al. |
| 2016/0190937 | A1 | 6/2016 | Lin et al. |
| 2018/0069479 | A1 | 3/2018 | Lin et al. |

OTHER PUBLICATIONS

United States Patent and Trademark Office, Notice of Allowance dated Feb. 9, 2017, in U.S. Appl. No. 14/604,819.

United States Patent and Trademark Office, Office Action dated Feb. 8, 2017, in U.S. Appl. No. 14/703,747.

United States Patent and Trademark Office, Notice of Allowance dated Jul. 12, 2017, in U.S. Appl. No. 14/703,747.

United States Patent and Trademark Office, Office Action dated Mar. 27, 2018, in U.S. Appl. No. 15/711,867.

United States Patent and Trademark Office, Notice of Allowance dated Oct. 11, 2018, in U.S. Appl. No. 15/711,867.

* cited by examiner

SYSTEMS AND METHODS FOR VOLTAGE REGULATION OF PRIMARY SIDE REGULATED POWER CONVERSION SYSTEMS WITH COMPENSATION MECHANISMS

1. CROSS-REFERENCES TO RELATED APPLICATIONS

This application is a continuation of U.S. patent application Ser. No. 14/604,819, filed Jan. 26, 2015, which claims priority to Chinese Patent Application No. 201410838058.3, filed Dec. 24, 2014, both of these applications being incorporated by reference herein for all purposes.

2. BACKGROUND OF THE INVENTION

Certain embodiments of the present invention are directed to integrated circuits. More particularly, some embodiments of the invention provide voltage regulation. Merely by way of example, some embodiments of the invention have been applied to power conversion systems. But it would be recognized that the invention has a much broader range of applicability.

FIG. 1 is a simplified diagram showing a conventional flyback power conversion system. The power conversion system 100 includes a primary winding 102, a secondary winding 104, an auxiliary winding 114, a power switch 106, a current sensing resistor 108, two rectifying diodes 110 and 116, two capacitors 112 and 118, three resistors 120, 122 and 124, and a system controller 160. For example, the power switch 106 is a bipolar transistor. In another example, the power switch 106 is a field effect transistor (e.g., a metal-oxide-semiconductor field effect transistor).

As shown in FIG. 1, the power conversion system 100 uses a transformer including the primary winding 102 and the secondary winding 104 to isolate a primary side and a secondary side of the power conversion system 100. Information related to an output voltage 126 on the secondary side can be extracted through the auxiliary winding 114 and a feedback signal 154 is generated based on information related to the output voltage 126. The controller 160 receives the feedback signal 154, and generates a drive signal 156 to turn on and off the switch 106 in order to regulate the output voltage 126.

When the power switch 106 is closed (e.g., on), the energy is stored in the transformer including the primary winding 102 and the secondary winding 104. Then, when the power switch 106 is open (e.g., off), the stored energy is released to the output terminal, and the voltage of the auxiliary winding 114 maps the output voltage 126 as follows.

$$V_{FB} = \frac{R_2}{R_1 + R_2} \times V_{aux} = k \times n \times (V_O + V_F + I_O + R_{eq}) \quad \text{(Equation 1)}$$

where $V_{FB}$ represents the feedback signal 154, $V_{aux}$ represents a voltage 158 of the auxiliary winding 114, $R_1$ and $R_2$ represent the resistance values of the resistors 122 and 124 respectively. In addition, k represents a feedback coefficient, n represents a turns ratio of the secondary winding 104 and the auxiliary winding 114, and $R_{eq}$ represents a cable resistance 120. Further, $V_O$ represents the output voltage 126, $I_O$ represents an output current 128, and $V_F$ represents a forward voltage of the rectifying diode 110.

A switching period of the switch 106 includes an on-time period during which the switch 106 is closed (e.g., on) and an off-time period during which the switch 106 is open (e.g., off). For example, in a discontinuous conduction mode (DCM), a next switching cycle does not start until a period of time after the completion of a demagnetization process associated with the transformer including the primary winding 102 and the secondary winding 104. In another example, in a continuous conduction mode (CCM), a next switching cycle starts before the completion of the demagnetization process. Thus, the actual length of the demagnetization process before the next switching cycle starts is limited to the off-time period of the switch 106. FIG. 2(A) and FIG. 2(B) are simplified conventional timing diagrams for the power conversion system 100 that operates in the DCM mode and in the CCM mode, respectively.

FIG. 2(A) is a simplified conventional timing diagram for the flyback power conversion system 100 that operates in the discontinuous conduction mode (DCM). The waveform 170 represents the voltage 158 of the auxiliary winding 114 as a function of time, and the waveform 172 represents a secondary current 162 flowing through the secondary winding 104 as a function of time.

Three time periods are shown in FIG. 2(A), including an on-time period $T_{on}$, an off-time period $T_{off}$ and a demagnetization period $T_{Demag}$. For example, $T_{on}$ starts at time $t_0$ and ends at time $t_1$, $T_{Demag}$ starts at the time $t_1$ and ends at time $t_3$, and $T_{off}$ starts at the time $t_1$ and ends at time $t_4$. In another example, $t_0 \leq t_1 \leq t_2 \leq t_3 \leq t_4$.

The controller 160 often implements a sample-and-hold mechanism. When the demagnetization process on the secondary side of the power conversion system 100 is almost completed (e.g., at $t_3$), the secondary current 162 becomes almost zero (e.g., as shown by the waveform 172). The voltage 158 of the auxiliary winding 114 is usually sampled at $t_2$ (e.g., point A). The sampled voltage value is often held until the voltage 158 is sampled again during a next demagnetization period. Through a negative feedback loop, the sampled voltage value can become equal to a reference voltage $V_{ref}$ as follows:

$$V_{FB} = V_{ref} \quad \text{(Equation 2)}$$

Thus, the output voltage 126 can be determined as follows:

$$V_O = \frac{V_{ref}}{k \times n} - V_F - I_O \times R_{eq} \quad \text{(Equation 3)}$$

FIG. 2(B) is a simplified conventional timing diagram for the flyback power conversion system 100 that operates in the continuous conduction mode (CCM). The waveform 202 represents the voltage 158 of the auxiliary winding 114 as a function of time, the waveform 204 represents a secondary current 162 flowing through the secondary winding 104 as a function of time, and the waveform 206 represents a primary current 164 flowing through the primary winding 102 as a function of time.

Three time periods are shown in FIG. 2(B), including an on-time period $T_{on}$, an off-time period $T_{off}$ and a demagnetization period $T_{Demag}$. For example, $T_{on}$ starts at time $t_5$ and ends at time $t_6$, $T_{Demag}$ starts at the time $t_6$ and ends at time $t_8$, and $T_{off}$ starts at the time $t_6$ and ends at the time $t_8$. In another example, $t_5 \leq t_6 \leq t_7 \leq t_8$.

The controller 160 often implements a sample-and-hold mechanism. When the switching cycle related to the secondary side of the power conversion system 100 almost ends (e.g., at $t_8$), the secondary current 162 becomes close to $I_{sec\_2}$ (e.g., as shown by the waveform 204). The voltage 158 of the auxiliary winding 114 is usually sampled at $t_7$ (e.g., point B). The sampled voltage value is often held until the voltage 158 is sampled again during a next demagnetization period. Through a negative feedback loop, the sampled voltage value can become equal to a reference voltage $V_{ref}$ as follows:

$$V_{FB} = V_{ref} \quad \text{(Equation 4)}$$

Thus, the output voltage 126 can be determined as follows:

$$V_O = \frac{V_{ref}}{k \times n} - V_F - I_O \times R_{eq} \quad \text{(Equation 5)}$$

The system 100 has some disadvantages. For example, parameter variations of certain circuit components may affect the voltage regulation. Hence, it is highly desirable to improve techniques for voltage regulation of power conversion systems.

3. BRIEF SUMMARY OF THE INVENTION

Certain embodiments of the present invention are directed to integrated circuits. More particularly, some embodiments of the invention provide voltage regulation. Merely by way of example, some embodiments of the invention have been applied to power conversion systems. But it would be recognized that the invention has a much broader range of applicability.

According one embodiment, a system controller includes: a first sampling component configured to sample a sensing signal and determine a compensation signal based on at least in part on the sensing signal, the sensing signal being associated with a first current flowing through a primary winding of a power conversion system; a signal processing component configured to receive a feedback signal and the compensation signal and generate a first signal based at least in part on the feedback signal and the compensation signal, the feedback signal being associated with an auxiliary winding coupled with a secondary winding of the power conversion system; an error amplifier configured to receive the first signal and a reference signal and generate an amplified signal based at least in part on the first signal and the reference signal; a modulation component configured to receive the amplified signal and generate a modulation signal based at least in part on the amplified signal; and a driver component configured to receive the modulation signal and output a drive signal based at least in part on the modulation signal to close or open a first switch to affect the first current. The system controller is configured to change the drive signal based on at least information associated with the compensation signal in order to adjust a winding voltage of the secondary winding and to at least partially compensate for a change in a forward voltage of a rectifying diode associated with the secondary winding.

According to another embodiment, a system controller includes: a first sampling component configured to sample a sensing signal and determine a compensation signal based on at least in part on the sensing signal, the sensing signal being associated with a first current flowing through a primary winding of a power conversion system; a summation component configured to receive the compensation signal and a reference signal and generate a first signal based at least in part on the compensation signal and a reference signal, the first signal being related to a combination of the compensation signal and the reference signal; an error amplifier configured to receive the first signal and a second signal and generate an amplified signal based at least in part on the first signal and the second signal, the second signal being related to a feedback signal associated with an auxiliary winding coupled with a secondary winding of the power conversion system; a modulation component configured to receive the amplified signal and generate a modulation signal based at least in part on the amplified signal; and a driver component configured to receive the modulation signal and output a drive signal based at least in part on the modulation signal to close or open a first switch to affect the first current. The system controller is configured to change the drive signal based on at least information associated with the compensation signal in order to adjust a winding voltage of the secondary winding and to at least partially compensate for a change in a forward voltage of a rectifying diode associated with the secondary winding.

According to yet another embodiment, a system controller includes: a compensation component configured to generate a compensation signal based at least in part on an on-time period associated with a first switch of a power conversion system, the first switch being closed during the on-time period; a summation component configured to receive the compensation signal and a reference signal and generate a first signal based at least in part on the compensation signal and a reference signal, the first signal being related to a combination of the compensation signal and the reference signal; an error amplifier configured to receive the first signal and a second signal and generate an amplified signal based at least in part on the first signal and the second signal, the second signal being related to a feedback signal associated with an auxiliary winding coupled with a secondary winding of the power conversion system; a modulation component configured to receive the amplified signal and generate a modulation signal based at least in part on the amplified signal; and a driver component configured to receive the modulation signal and output a drive signal based at least in part on the modulation signal to close or open a first switch to affect a first current flowing through a primary winding of the power conversion system. The system controller is configured to change the drive signal based on at least information associated with the compensation signal in order to adjust a winding voltage of the secondary winding and to at least partially compensate for a change in a forward voltage of a rectifying diode associated with the secondary winding.

In one embodiment, a system controller includes: an error amplifier configured to receive a first signal and a reference signal and generate an amplified signal based at least in part on the first signal and the reference signal, the first signal being related to a feedback signal associated with an auxiliary winding coupled with a secondary winding of a power conversion system; a feed-forward component configured to receive the amplified signal and generate a first voltage based at least in part on the amplified signal; a low-pass filter configured to receive the amplified signal and generate a second voltage based at least in part on the amplified signal; a modulation component configured to receive a compensation signal and a sensing signal and generate a modulation signal based at least in part on the compensation signal and the sensing signal, the compensations signal being related to a combination of the first voltage and the second voltage; and a driver component configured to receive the modulation signal and generate a drive signal based at least in part on the modulation signal to close or open a switch to affect the first current.

In another embodiment, a method for a power conversion system includes: sampling a sensing signal, the sensing signal being associated with a first current flowing through a primary winding of a power conversion system; determining a compensation signal based on at least in part on the sensing signal; receiving a feedback signal and the compensation signal, the feedback signal being associated with an auxiliary winding coupled with a secondary winding of the power conversion system; generating a first signal based at least in part on the feedback signal and the compensation signal; receiving the first signal and a reference signal; generating an amplified signal based at least in part on the first signal and the reference signal; receiving the amplified signal; generating a modulation signal based at least in part on the amplified signal; receiving the modulation signal; and outputting a drive signal based at least in part on the modulation signal to close or open a first switch to affect the first current. The outputting a drive signal based at least in part on the modulation signal to close or open a first switch to affect the first current includes: changing the drive signal based on at least information associated with the compensation signal in order to adjust a winding voltage of the secondary winding and to at least partially compensate for a change in a forward voltage of a rectifying diode associated with the secondary winding.

In yet another embodiment, a method for a power conversion system includes: sampling a sensing signal, the sensing signal being associated with a first current flowing through a primary winding of a power conversion system; determining a compensation signal based on at least in part on the sensing signal; receiving the compensation signal and a reference signal; generating a first signal based at least in part on the compensation signal and a reference signal, the first signal being related to a combination of the compensation signal and the reference signal; receiving the first signal and a second signal, the second signal being related to a feedback signal associated with an auxiliary winding coupled with a secondary winding of the power conversion system; generating an amplified signal based at least in part on the first signal and the second signal; receiving the amplified signal; generating a modulation signal based at least in part on the amplified signal; receiving the modulation signal; and outputting a drive signal based at least in part on the modulation signal to close or open a first switch to affect the first current. The outputting a drive signal based at least in part on the modulation signal to close or open a first switch to affect the first current includes: changing the drive signal based on at least information associated with the compensation signal in order to adjust a winding voltage of the secondary winding and to at least partially compensate for a change in a forward voltage of a rectifying diode associated with the secondary winding.

According to one embodiment, a method for a power conversion system includes: determining a compensation signal based on at least in part on an on-time period associated with a first current flowing through a primary winding of a power conversion system; receiving the compensation signal and a reference signal; generating a first signal based at least in part on the compensation signal and a reference signal, the first signal being related to a combination of the compensation signal and the reference signal; receiving the first signal and a second signal, the second signal being related to a feedback signal associated with an auxiliary winding coupled with a secondary winding of the power conversion system; generating an amplified signal based at least in part on the first signal and the second signal; receiving the amplified signal; generating a modulation signal based at least in part on the amplified signal; receiving the modulation signal; and outputting a drive signal based at least in part on the modulation signal to close or open a first switch to affect the first current, the first switch being closed during the on-time period. The outputting a drive signal based at least in part on the modulation signal to close or open a first switch to affect the first current includes: changing the drive signal based on at least information associated with the compensation signal in order to adjust a winding voltage of the secondary winding and to at least partially compensate for a change in a forward voltage of a rectifying diode associated with the secondary winding.

According to another embodiment, a method for a power conversion system includes: receiving a first signal and a reference signal, the first signal being related to a feedback signal associated with an auxiliary winding coupled with a secondary winding of a power conversion system; generating an amplified signal based at least in part on the first signal and the reference signal; receiving the amplified signal; generating a first voltage based at least in part on the amplified signal; receiving the amplified signal; generating a second voltage based at least in part on the amplified signal; receiving a compensation signal and a sensing signal, the compensations signal being related to a combination of the first voltage and the second voltage; generating a modulation signal based at least in part on the compensation signal and the sensing signal; receiving the modulation signal; and generating a drive signal based at least in part on the modulation signal to close or open a switch to affect the first current.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide voltage regulation. Merely by way of example, some embodiments of the invention have been applied to power conversion systems. But it would be recognized that the invention has a much broader range of applicability.

Figure 3:
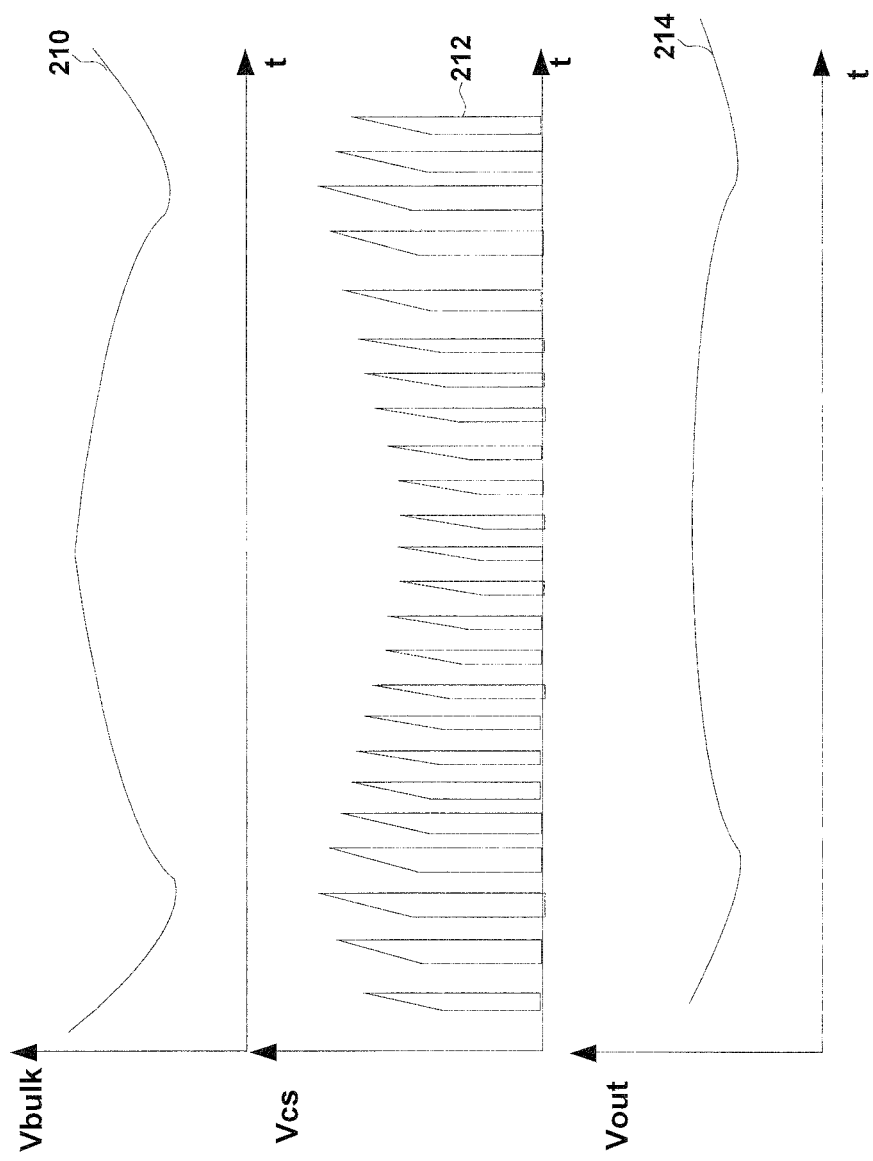
FIG. 3 is a simplified timing diagram for a flyback power conversion system that operates in the continuous conduction mode (CCM).

FIG. 3 is a simplified timing diagram for the flyback power conversion system 100 that operates in the continuous conduction mode (CCM). The waveform 210 represents an input voltage 198 (e.g., $V_{bulk}$) as a function of time, the waveform 212 represents a current sensing signal 196 (e.g., CS) associated with the primary current 164 flowing through the primary winding 102 as a function of time, and the waveform 214 represents the output voltage 126 as a function of time.

As shown in FIG. 3, when the system 100 operates completely in the CCM mode, the input voltage 198 fluctuates over time. The current sensing signal 196 is determined as follows:

$$V_{cs} = I_{pri} \times R_s \quad \text{(Equation 6)}$$

where $I_{pri}$ represents the primary current 164, and $R_s$ represents a resistance of the resistor 108. A duty cycle of the system 100 is determined as follows:

$$D = \frac{N \times (V_O + V_F)}{V_{in} + N \times (V_O + V_F)} \quad \text{(Equation 7)}$$

where $V_{in}$ represents the input voltage 198, and N represents a turns ratio between the primary winding 102 and the secondary winding 104. For example, a forward voltage associated with the diode 110 may vary to negatively affect the precision of voltage regulation.

Figure 1:
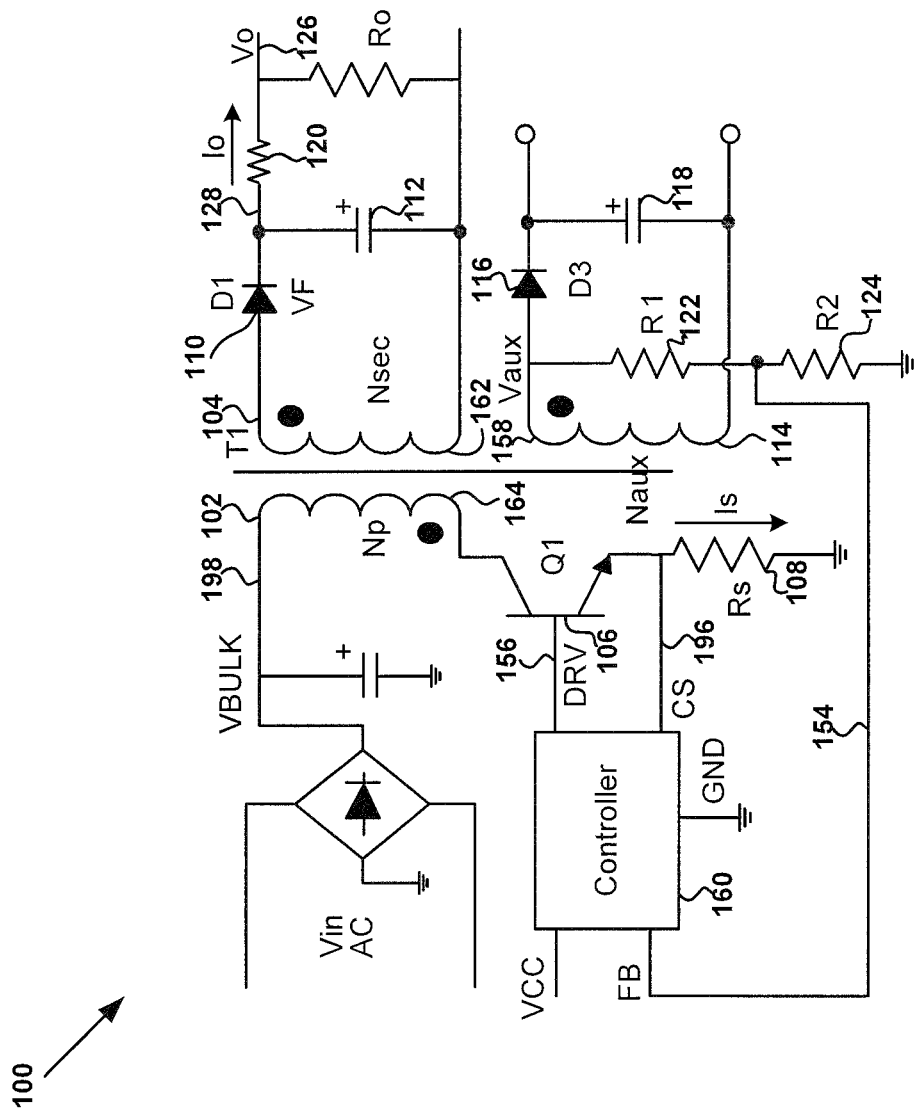
FIG. 1 is a simplified diagram showing a conventional flyback power conversion system.
Figure 2A:
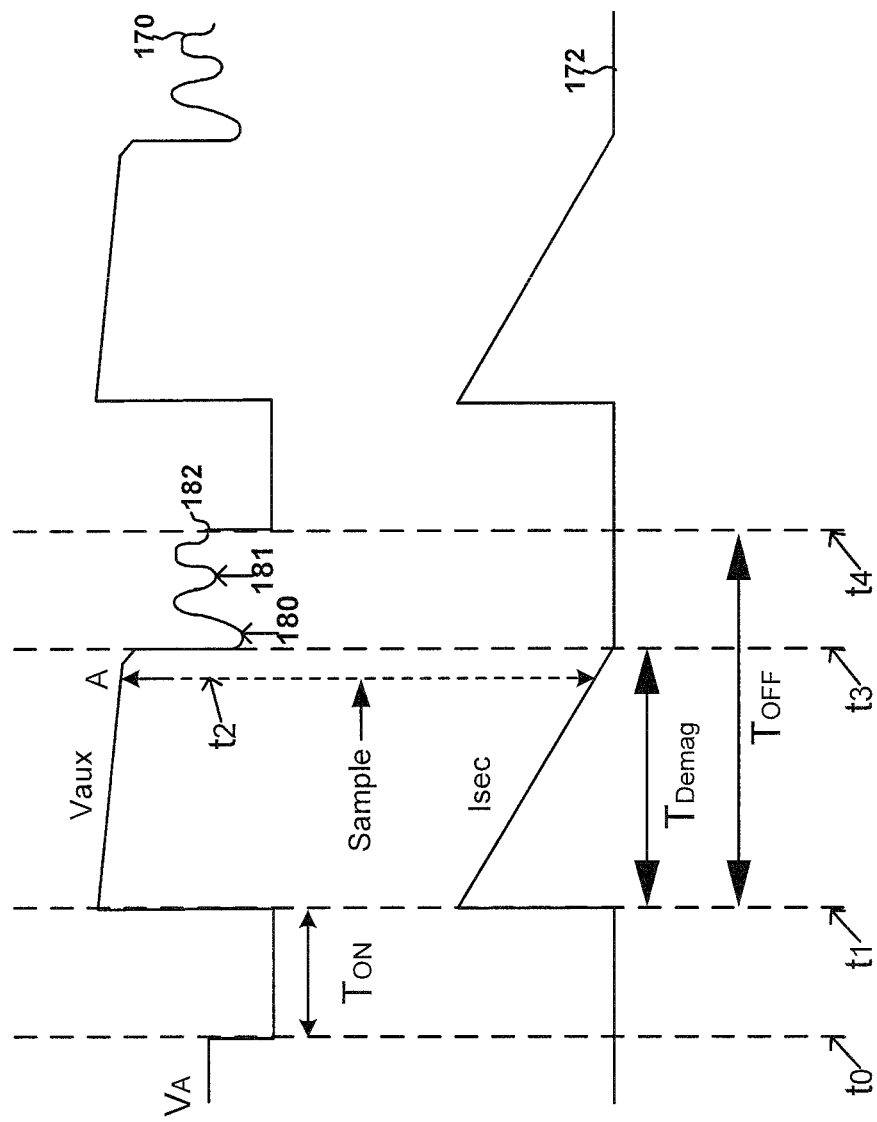
FIG. 2(A) is a simplified conventional timing diagram for a flyback power conversion system that operates in the discontinuous conduction mode (DCM).
Figure 2B:
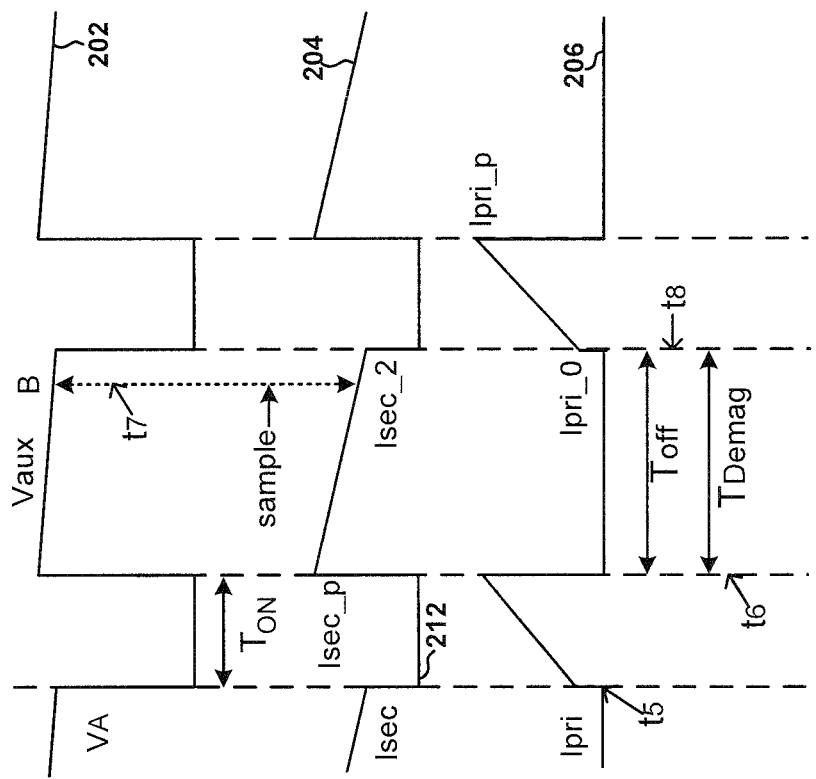
FIG. 2(B) is a simplified conventional timing diagram for a flyback power conversion system that operates in the continuous conduction mode (CCM).

Referring to FIG. 2(B), when the system 100 operates in a CCM mode, the variation of a current that flows through the rectifying diode 110 at the sampling point (e.g., at $t_7$, point B) causes the forward voltage of the rectifying diode 110 to vary, and thus causes the feedback signal 154 to change so as to negatively affect the precision of the output voltage 126. Specifically, when the power conversion system 100 receives a high line input voltage, the system 100 operates in a DCM mode. The current that flows through the rectifying diode 110 has a small magnitude, and the associated forward voltage has a small magnitude. On the other hand, when the power conversion system 100 receives a low line input voltage, the system 100 operates in a CCM mode. The current that flows through the rectifying diode 110 has a large magnitude, and the associated forward voltage has a large magnitude. According to Equation 3 and Equation 5, the output voltage 126 may be too low when the input line voltage is low, and the output voltage 126 may be too high when the input line voltage is high.

Referring to FIG. 3, the fluctuation of the input voltage 198 may cause the current sensing signal 196 (e.g., CS) and/or the duty cycle of the system 100 to vary periodically. During the fluctuation periods of the input voltage 198, the system 100 enters the CCM mode with different extents, and the primary current 164 has different initial magnitudes during each on-time period associated with the switch 106. In turn, the forward voltage of the diode 110 varies. Low-frequency ripples (e.g., 100 Hz) may be generated in the output voltage 126.

Figure 4A:
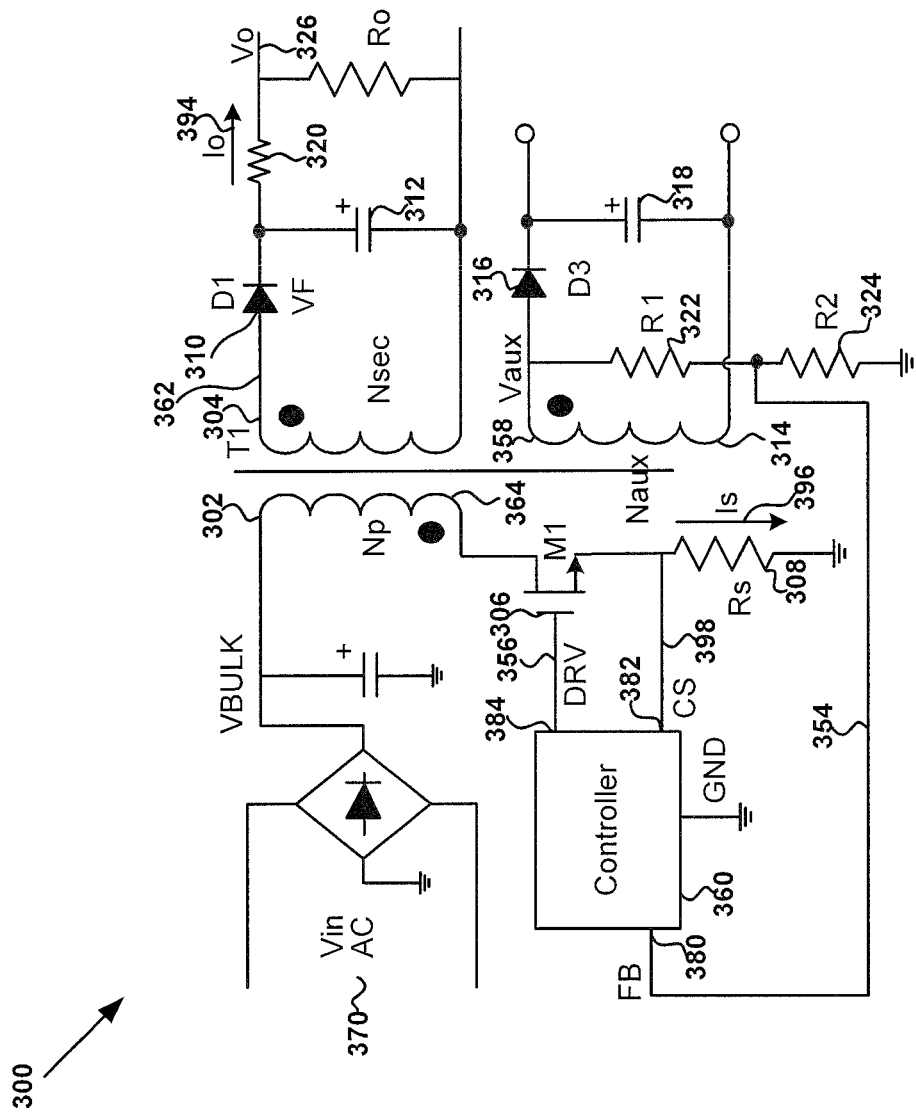
FIG. 4(A) is a simplified diagram showing a power conversion system with a controller according to an embodiment of the present invention.

FIG. 4(A) is a simplified diagram showing a power conversion system with a controller according to an embodiment of the present invention. This diagram is merely an example, which should not unduly limit the scope of the claims. One of ordinary skill in the art would recognize many variations, alternatives, and modifications. The power conversion system 300 includes a primary winding 302, a secondary winding 304, an auxiliary winding 314, a power switch 306, a current sensing resistor 308, two rectifying diodes 310 and 316, two capacitors 312 and 318, three resistors 320, 322 and 324, and a system controller 360. For example, the power switch 306 is a bipolar transistor. In another example, the power switch 306 is a field effect transistor. The controller 360 includes terminals 380, 382 and 384.

According to one embodiment, the power conversion system 300 uses a transformer including the primary winding 302 and the secondary winding 304 to separate a primary side and a secondary side of the power conversion system 300. For example, the power conversion system 300 receives an input voltage 370 on the primary side. In another example, information related to an output voltage 326 on the secondary side can be extracted through the auxiliary winding 314 and a feedback signal 354 is generated based on information related to the output voltage 326. In another example, the controller 360 receives the feedback signal 354, and generates a drive signal 356 to turn on and off the switch 306 in order to regulate the output voltage 326. In yet another example, the operation mode (e.g., DCM, CCM, QR) of the power conversion system 300 is affected by the controller 360. When the system 300 operates in a CCM mode, a current sensing signal 398 (e.g., CS) that is related to a current 396 flowing through the primary winding 302 is sampled, directly or indirectly, for compensation of variance of a forward voltage of the diode 310 associated with a current variance of the diode 310, according to certain embodiments. The system 300 includes a loop compensation network for introducing one or more low frequency poles to regulate (e.g., reduce) system bandwidth, according to some embodiments. For example, the secondary winding 304 is associated with a voltage 362, and the auxiliary winding 314 is associated with a voltage 358.

Figure 4B:
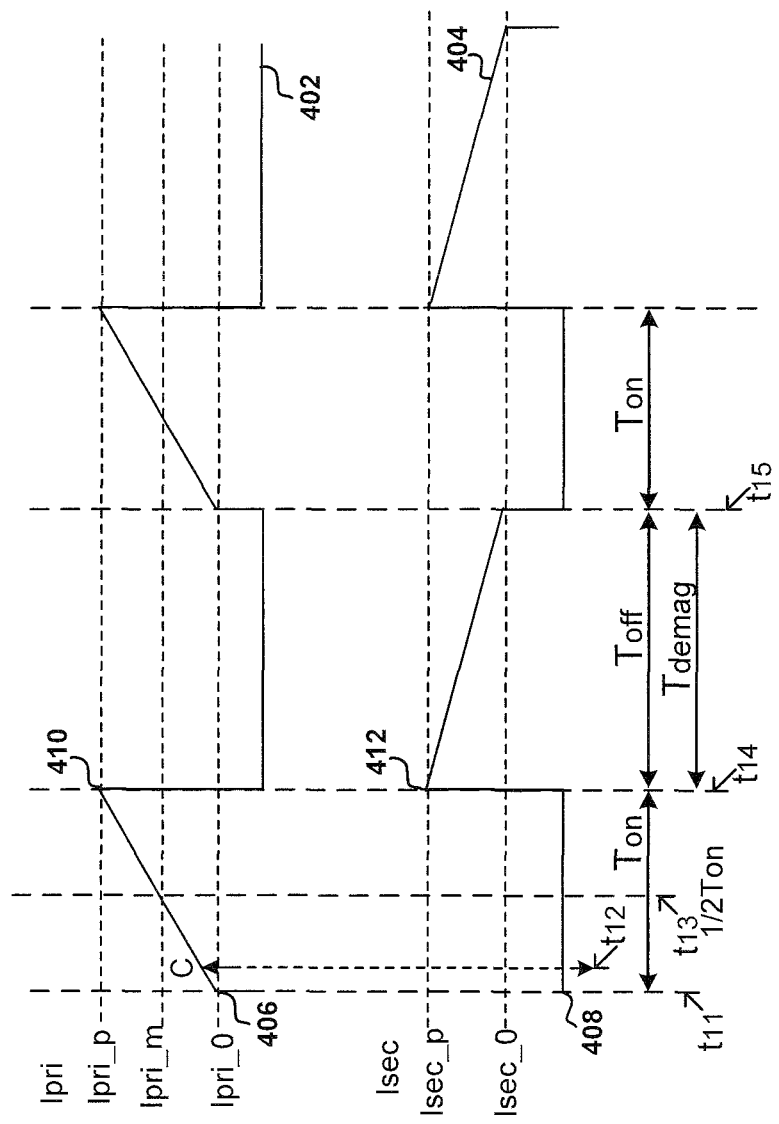
FIG. 4(B) is a simplified timing diagram for a power conversion system as shown in FIG. 4(A) that operates in a CCM mode according to an embodiment of the present invention.

FIG. 4(B) is a simplified timing diagram for the power conversion system 300 that operates in a CCM mode according to an embodiment of the present invention. This diagram is merely an example, which should not unduly limit the scope of the claims. One of ordinary skill in the art would recognize many variations, alternatives, and modifications. The waveform 402 represents the primary current 396 flowing through the primary winding 302 as a function of time, and the waveform 404 represents a secondary current 394 flowing through the secondary winding 304 as a function of time.

In one embodiment, three time periods are shown in FIG. 4(B), including an on-time period $T_{on}$, an off-time period $T_{off}$ and a demagnetization period $T_{Demag}$. For example, $T_{on}$ starts at time $t_{11}$ and ends at time $t_{14}$, $T_{Demag}$ starts at the time $t_{14}$ and ends at time $t_{15}$, and $T_{off}$ starts at the time $t_{14}$ and ends at the time $t_{15}$. In another example, $t_{11} \leq t_{12} \leq t_{13} \leq t_{14} \leq t_{15}$.

According to one embodiment, the controller 360 implements a sample-and-hold mechanism. For example, at the beginning of the on-time period (e.g., at $t_{11}$), the primary current 396 has a magnitude 406 (e.g., $I_{pri\_0}$), and the secondary current 394 has a magnitude 408 (e.g., $I_{sec\_0}$). During the on-time period, the primary current 396 increases (e.g., linearly) and the secondary current 394 remains approximately at the magnitude 408. As an example, at $t_{14}$, the primary current 396 has a magnitude 410 (e.g., $I_{pri\_p}$), and the secondary current 394 changes from the magnitude 408 to a larger magnitude 412 (e.g., $I_{sec\_p}$). In another example, the magnitude 406 indicates how far the system 300 enters the CCM mode. The larger the magnitude 406, the more the system 300 operates in the CCM model, and the forward voltage of the diode 310 becomes larger in magnitude, according to certain embodiments. For example, the following equations are determined related to the primary current 396 and the secondary current 394:

$$I_{sec\_p} = N \times I_{pri\_p}$$

$$I_{sec\_0} = N \times I_{pri\_0} \quad \text{(Equation 8)}$$

where N represents a turns ratio between the primary winding 302 and the secondary winding 304.

Figure 6:
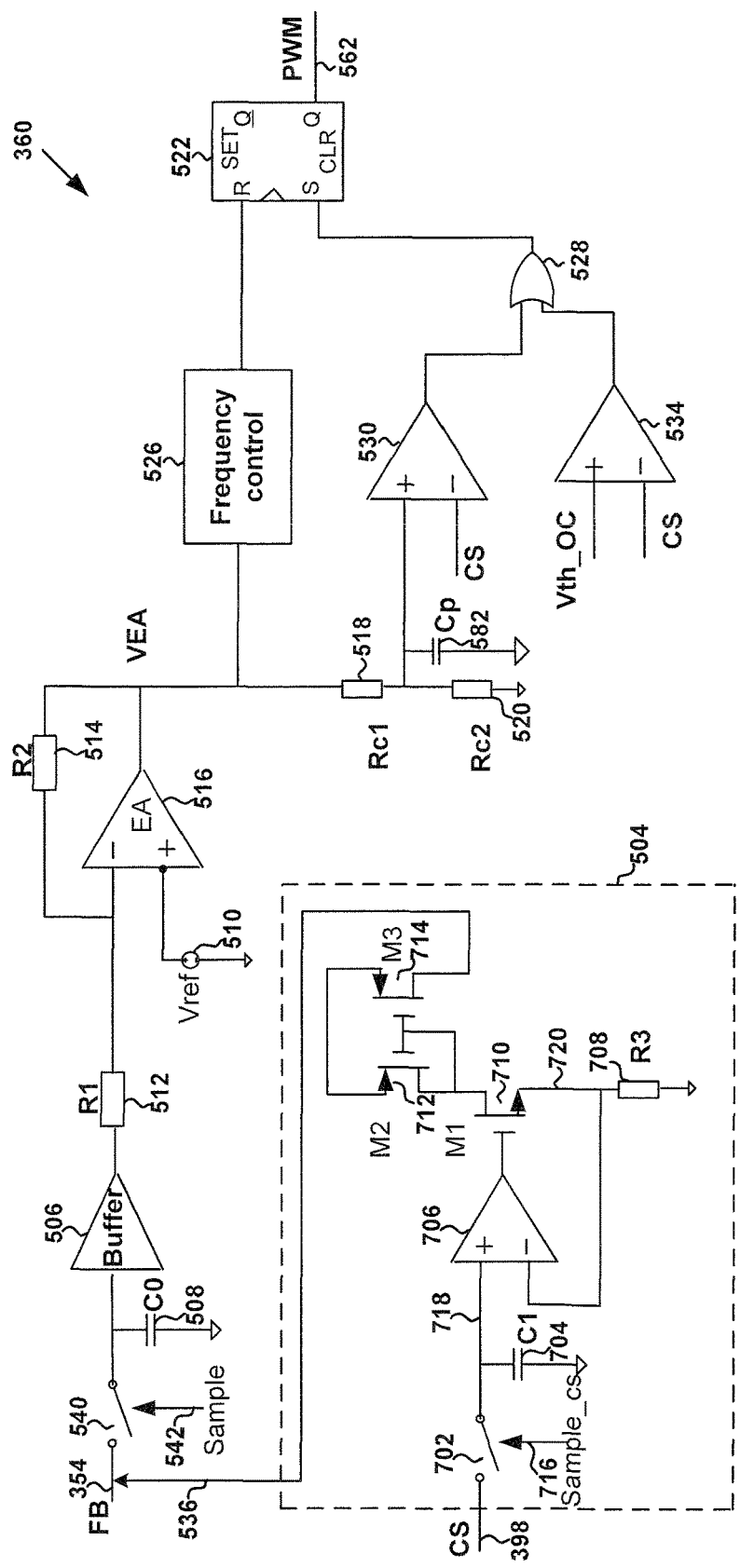
FIG. 6 is a simplified diagram showing certain components of the controller as shown in FIG. 5(A) according to an embodiment of the present invention.
Figure 7A:
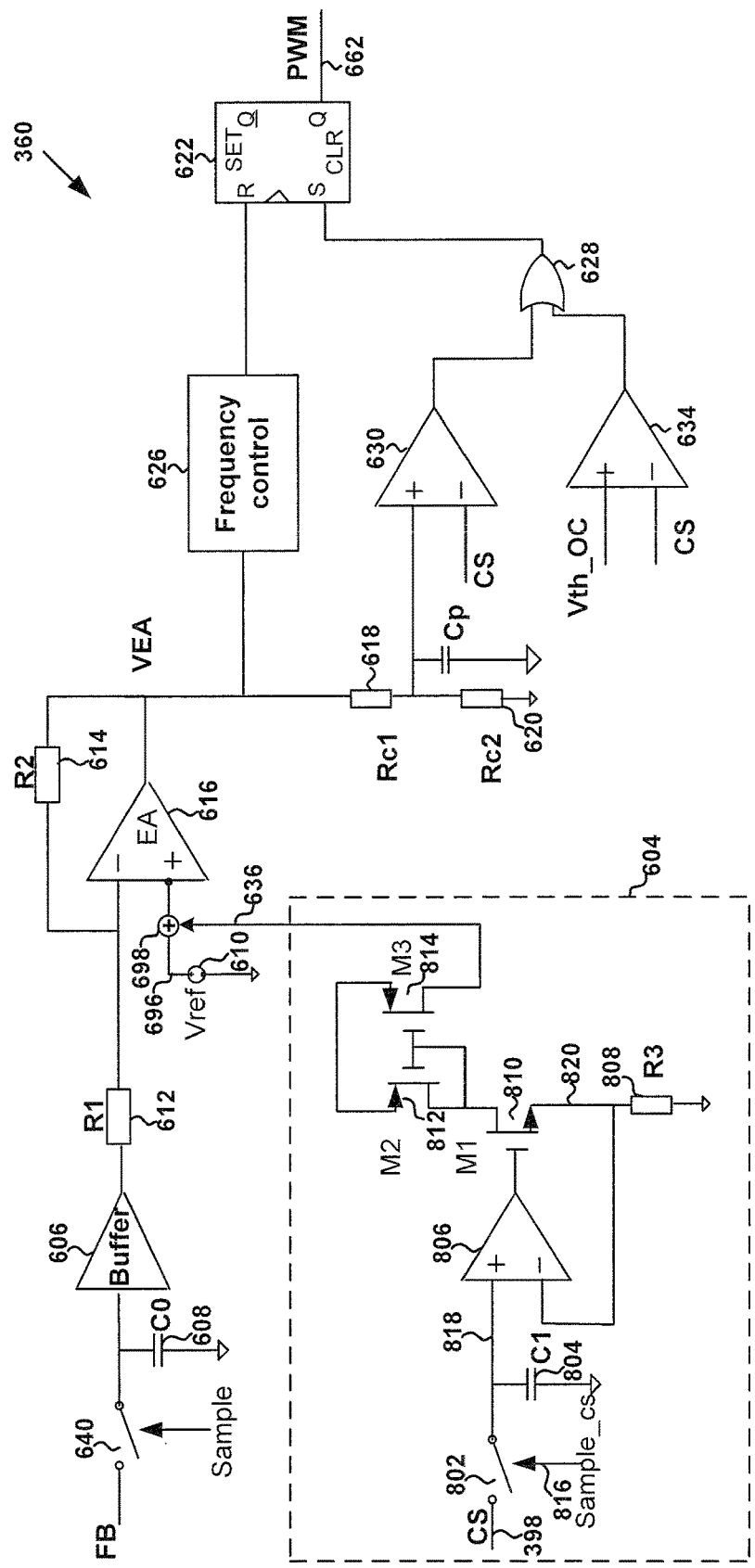
FIG. 7(A) is a simplified diagram showing certain components of the controller as shown in FIG. 5(B) according to an embodiment of the present invention.
Figure 7B:
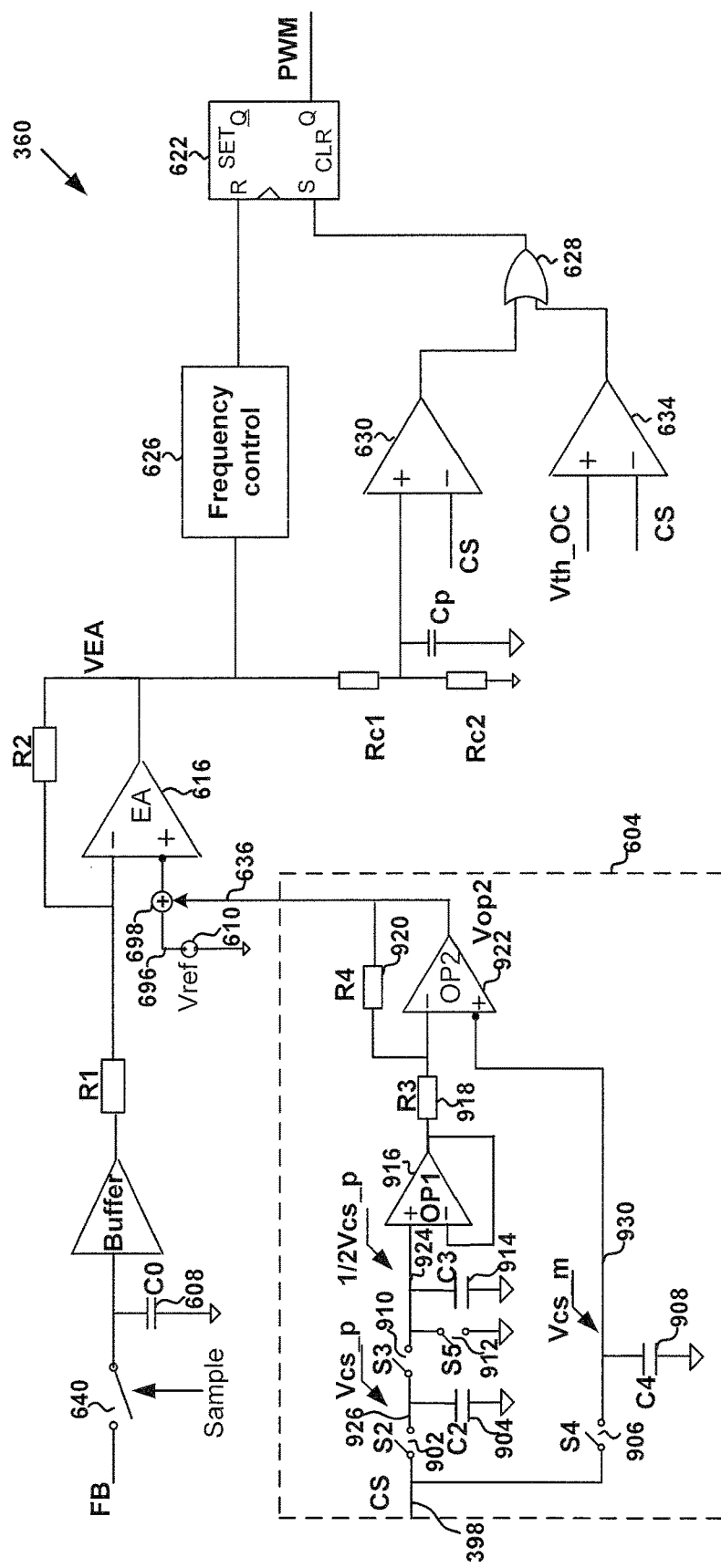
FIG. 7(B) is a simplified diagram showing certain components of the controller as shown in FIG. 5(B) according to another embodiment of the present invention.

In certain embodiments, the current sensing signal 398 is sampled (e.g., in a duration of a one-shot pulse) at a time $t_{12}$ (e.g., point C as shown in FIG. 4(B)) after a delay (e.g., 300 ns) when the switch 306 is closed (e.g., being turned on). Detailed example implementations are shown in FIG. 6 and FIG. 7(A). In some embodiments, a peak magnitude of the current sensing signal 398 (e.g., at the end of the on-time period) and a medium magnitude of the current sensing signal 398 (e.g., at the middle point of the on-time period) are sampled respectively, and the difference between the peak magnitude and the medium magnitude is used for compensation of the forward voltage of the diode 310. A detailed example implementation is shown in FIG. 7(B). In certain embodiments, instead of sampling the current sensing signal 398, an on-time period of the switch 306 is detected to determine a compensation signal and the forward voltage of the diode 310 can be compensated according to different duty cycles. A detailed example implementation is shown in FIG. 7(C).

Figure 5A:
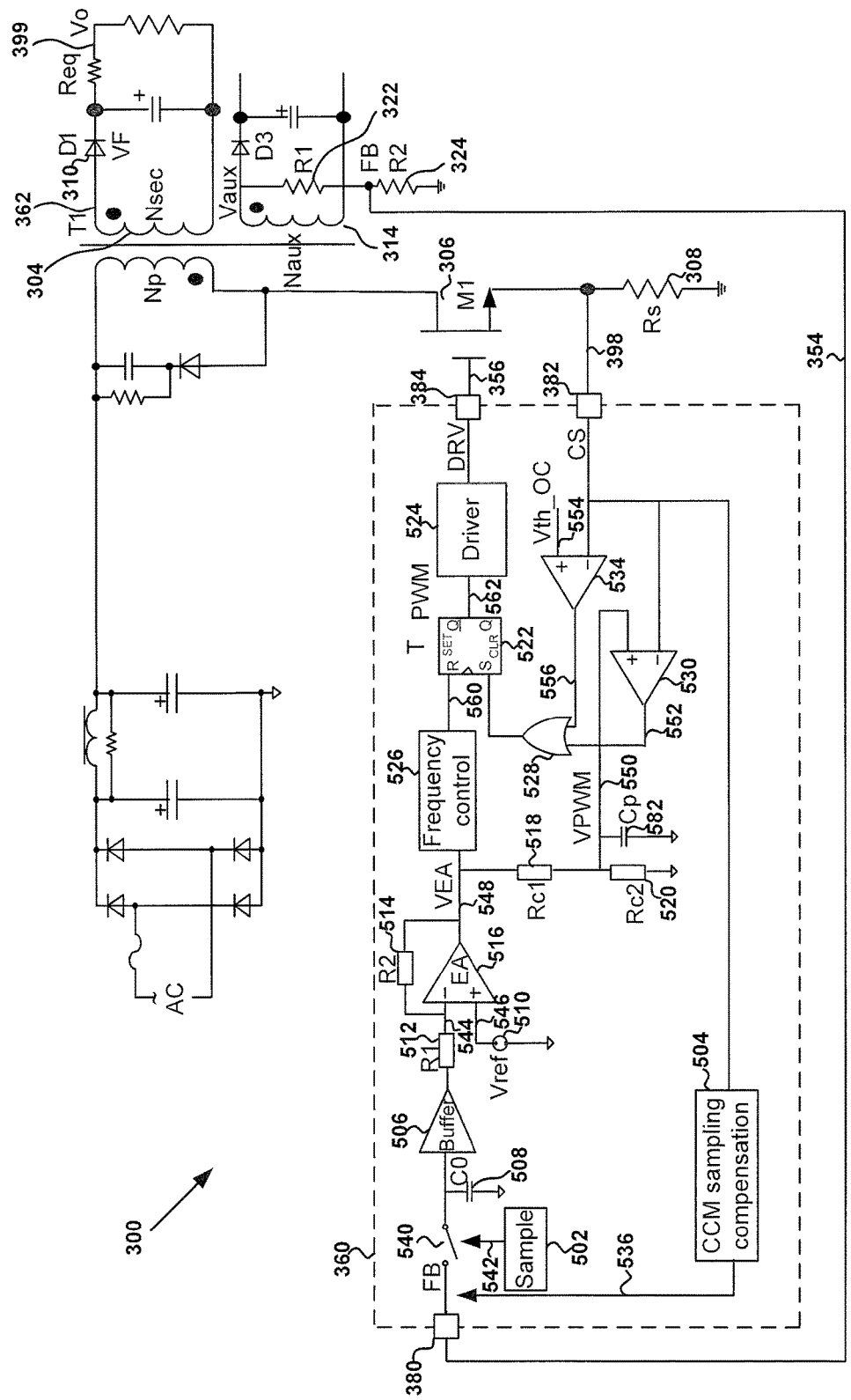
FIG. 5(A) is a simplified diagram showing a controller as part of the power conversion system as shown in FIG. 4(A) according to an embodiment of the present invention.

FIG. 5(A) is a simplified diagram showing the controller 360 as part of the power conversion system 300 according to an embodiment of the present invention. This diagram is merely an example, which should not unduly limit the scope of the claims. One of ordinary skill in the art would recognize many variations, alternatives, and modifications.

As shown in FIG. 5(A), the current sensing signal 398 is sampled by a sampling-and-compensation component 504 that generates a compensation signal 536, according to some embodiments. As an example, the compensation signal 536 includes a current flowing out of the controller 360 to a resistor network that includes the resistors 322 and 324 for compensation of the forward voltage of the diode 310. For example, the compensation signal 536 in combination with the feedback signal 354 is sampled and held through a sampling component 502, a switch 540 and a capacitor 508. Particularly, when the switch 540 is closed (e.g., being turned on) in response to a sampling signal 542 from the sampling component 502, the compensation signal 536 in combination with the feedback signal 354 is sampled. When the switch 540 is opened (e.g., being turned off) in response to the sampling signal 542 from the sampling component 502, the sampled compensation signal 536 in combination with the feedback signal 354 is held at the capacitor 508.

According to one embodiment, a signal 544 associated with the compensation signal 536 in combination with the feedback signal 354 is provided at an inverting input terminal (e.g., "−" terminal) of an error amplifier 516, and a reference signal 546 is provided by a reference signal generator 510 at a non-inverting input terminal (e.g., "+" terminal) of the error amplifier 516. As an example, the resistor 514 is connected between the inverting input terminal and an output terminal of the error amplifier 516. For example, an amplified signal 548 that indicates the difference between the signal 544 and the reference signal 546 is generated by the error amplifier 516. As an example, a compensation network that includes resistors 518 and 520 and a capacitor 582 provides a signal 550 (e.g., $V_{PWM}$) based on the amplified signal 548. In another example, a comparator 530 compares the signal 550 with the current sensing signal 398 and outputs a comparison signal 552. Another comparator 534 compares the current sensing signal 398 and a threshold signal 554 and outputs another comparison signal 556. In yet another example, a flip-flop component 522 generates a modulation signal 562 based on at least information associated with the comparison signals 552 and 556 and a frequency control signal 560 from a frequency control component 526. In yet another example, a driver component 524 outputs the drive signal 356 to affect the status of the power switch 306. As an example, a buffer 506, an OR gate 528 and resistors 512 and 514 are also included in the controller 360.

As shown in FIG. 5(A), the system controller 360 changes the drive signal 356 based at least in part on the compensation signal 536, and accordingly the voltage signal 362 associated with the secondary winding 304 is adjusted to compensate (e.g., partially or completely) for a change in a forward voltage of the rectifying diode 310 according to certain embodiments. For example, if the forward voltage of the rectifying diode 310 becomes larger, the system controller 360 changes the drive signal 356 so that the voltage signal 362 also increases. In another example, this increase in the voltage signal 362 compensates (e.g., partially or completely) for the increase in the forward voltage of the rectifying diode 310. In yet another example, this increase in the voltage signal 362 completely compensates for the increase in the forward voltage of the rectifying diode 310 so that the output voltage 399 of the power conversion system 300 does not change despite the increase in the forward voltage of the rectifying diode 310.

As discussed above and further emphasized here, FIG. 5(A) is merely an example, which should not unduly limit the scope of the claims. One of ordinary skill in the art would recognize many variations, alternatives, and modifications. For example, instead of being combined with the feedback signal 354, the compensation signal 536 can be combined with the reference signal 546.

Figure 5B:
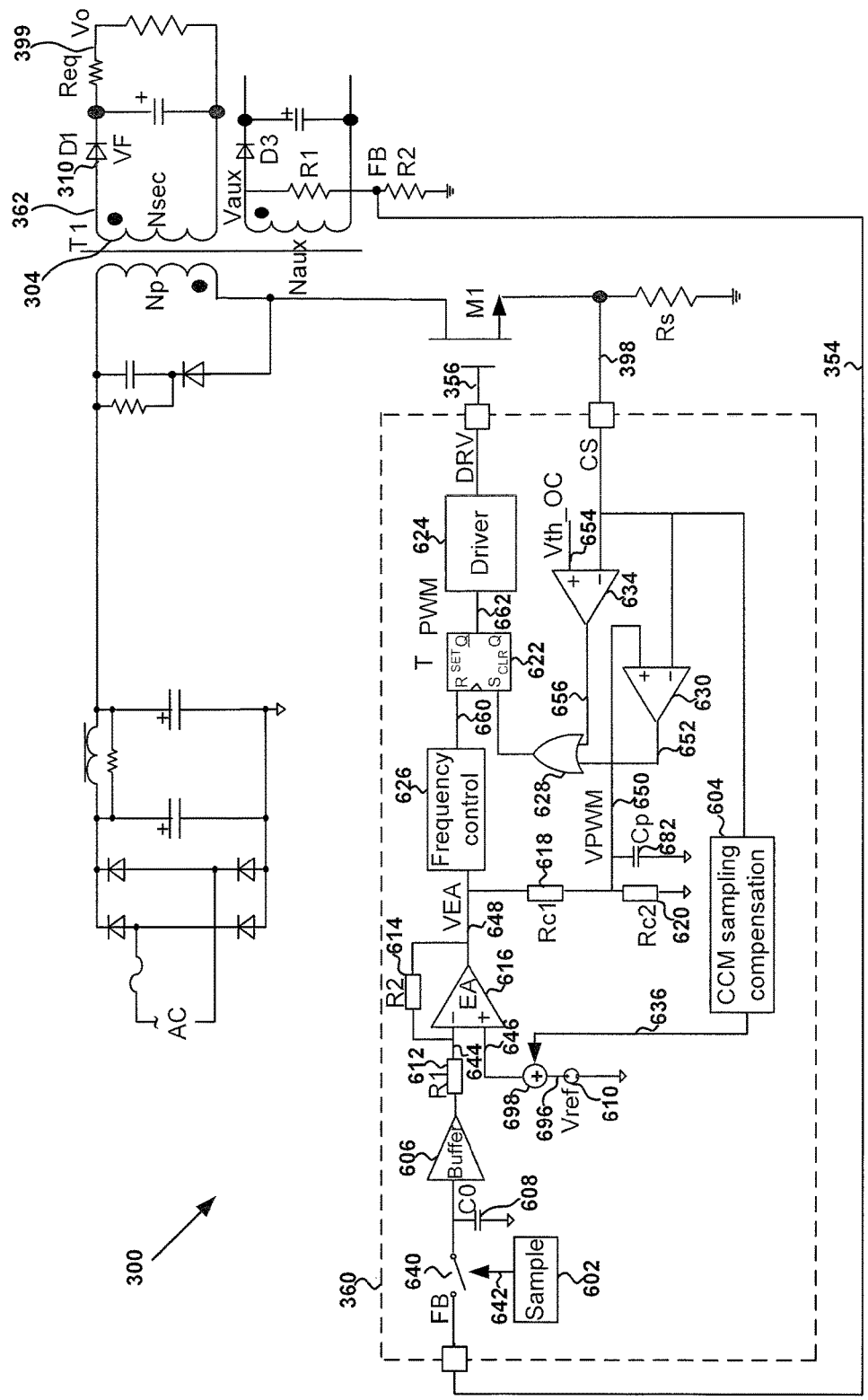
FIG. 5(B) is a simplified diagram showing a controller as part of the power conversion system as shown in FIG. 4(A) according to another embodiment of the present invention.

FIG. 5(B) is a simplified diagram showing the controller 360 as part of the power conversion system 300 according to another embodiment of the present invention. This diagram is merely an example, which should not unduly limit the scope of the claims. One of ordinary skill in the art would recognize many variations, alternatives, and modifications.

As shown in FIG. 5(B), the current sensing signal 398 is sampled by a sampling-and-compensation component 604 that generates a compensation signal 636, according to some embodiments. As an example, the compensation signal 636 includes a voltage signal for compensation of the forward voltage of the diode 310. For example, the compensation signal 636 is combined with a reference signal 696 (e.g., at a summation component 698) to generate a signal 646 that is provided at a non-inverting input terminal (e.g., "+" terminal) of an error amplifier 616.

According to one embodiment, the feedback signal 354 is sampled and held through a sampling component 602, a switch 640 and a capacitor 608. For example, when the switch 640 is closed (e.g., being turned on) in response to a sampling signal 642 from the sampling component 602, the feedback signal 354 is sampled. When the switch 640 is opened (e.g., being turned off) in response to the sampling signal 642 from the sampling component 602, the sampled feedback signal 354 is held at the capacitor 608. In another example, a signal 644 associated with the feedback signal 354 is provided at an inverting input terminal (e.g., "−" terminal) of the error amplifier 616. In yet another example, an amplified signal 648 that indicates the difference between the signal 644 and the signal 646 is generated by the error amplifier 616. As an example, a compensation network that includes resistors 618 and 620 and a capacitor 682 provides a signal 650 (e.g., $V_{PWM}$) based on the amplified signal 648. In another example, a comparator 630 compares the signal 650 with the current sensing signal 398 and outputs a comparison signal 652. Another comparator 634 compares the current sensing signal 398 and a threshold signal 654 and outputs another comparison signal 656. In yet another example, a flip-flop component 622 generates a modulation signal 662 based on at least information associated with the comparison signals 652 and 656 and a frequency control signal 660 from a frequency control component 626. In yet another example, a driver component 624 outputs the drive signal 356 to affect the status of the power switch 306. As an example, a buffer 606, an OR gate 628 and resistors 612 and 614 are also included in the controller 360. As an example, the system controller 360 changes the drive signal 356 based at least in part on the compensation signal 636, and accordingly the voltage signal 362 associated with the secondary winding 304 is adjusted to compensate (e.g., partially or completely) for a change in a forward voltage of the rectifying diode 310.

As shown in FIG. 5(B), the system controller 360 changes the drive signal 356 based at least in part on the compensation signal 636, and accordingly the voltage signal 362 associated with the secondary winding 304 is adjusted to compensate (e.g., partially or completely) for a change in a forward voltage of the rectifying diode 310 according to certain embodiments. For example, if the forward voltage of the rectifying diode 310 becomes larger, the system controller 360 changes the drive signal 356 so that the voltage signal 362 also increases. In another example, this increase in the voltage signal 362 compensates (e.g., partially or completely) for the increase in the forward voltage of the rectifying diode 310. In yet another example, this increase in the voltage signal 362 completely compensates for the increase in the forward voltage of the rectifying diode 310 so that the output voltage 399 of the power conversion system 300 does not change despite the increase in the forward voltage of the rectifying diode 310.

FIG. 6 is a simplified diagram showing certain components of the controller 360 as shown in FIG. 5(A) according to an embodiment of the present invention. This diagram is merely an example, which should not unduly limit the scope of the claims. One of ordinary skill in the art would recognize many variations, alternatives, and modifications.

As shown in FIG. 6, the sampling-and-compensation component 504 samples the current sensing signal 398 and generates a compensation signal 536, according to some embodiments. For example, the current sensing signal 398 is sampled and held through a switch 702 and a capacitor 704. Particularly, when the switch 702 is closed (e.g., being turned on) in response to a sampling signal 716, the current sensing signal 398 is sampled. When the switch 702 is opened (e.g., being turned off) in response to the sampling signal 716, the sampled current sensing signal 398 is held at the capacitor 704. In some embodiments, a one-shot pulse is generated in the sampling signal 716 (e.g., by a sampling component) immediately when the switch 306 is closed (e.g., being turned on) so that the current sensing signal 398 is sampled in the duration of the one-shot pulse (e.g., 300 ns). In certain embodiments, a one-shot pulse is generated in the sampling signal 716 (e.g., by a sampling component) after a delay (e.g., 300 ns) when the switch 306 is closed (e.g., being turned on) so that the current sensing signal 398 is sampled in the duration of the one-shot pulse (e.g., 300 ns).

According to one embodiment, a signal 718 associated with the sampled and held current sensing signal 398 is provided at a non-inverting input terminal (e.g., "+" terminal) of an amplifier 706 (e.g., a transconductance amplifier) for compensation of the forward voltage of the diode 310. For example, a current 720 is generated to flow through transistors 710 and 712 and a resistor 708, and is mirrored to generate the compensation signal 536 that is combined with the feedback signal 354.

FIG. 7(A) is a simplified diagram showing certain components of the controller 360 as shown in FIG. 5(B) according to an embodiment of the present invention. This diagram is merely an example, which should not unduly limit the scope of the claims. One of ordinary skill in the art would recognize many variations, alternatives, and modifications.

As shown in FIG. 7(A), the sampling-and-compensation component 604 samples the current sensing signal 398 and generates a compensation signal 636, according to some embodiments. For example, the current sensing signal 398 is sampled and held through a switch 802 and a capacitor 804. Particularly, when the switch 802 is closed (e.g., being turned on) in response to a sampling signal 816, the current sensing signal 398 is sampled. When the switch 802 is opened (e.g., being turned off) in response to the sampling signal 816, the sampled current sensing signal 398 is held at the capacitor 804. In some embodiments, a one-shot pulse is generated in the sampling signal 816 (e.g., by a sampling component) immediately when the switch 306 is closed (e.g., being turned on) so that the current sensing signal 398 is sampled in the duration of the one-shot pulse (e.g., 300 ns). In certain embodiments, a one-shot pulse is generated in the sampling signal 816 (e.g., by a sampling component) after a delay (e.g., 300 ns) when the switch 306 is closed (e.g., being turned on) so that the current sensing signal 398 is sampled in the duration of the one-shot pulse (e.g., to reduce effects of turn-on spikes).

According to one embodiment, a signal 818 associated with the sampled and held current sensing signal 398 is provided at a non-inverting input terminal (e.g., "+" terminal) of an amplifier 806 (e.g., a transconductance amplifier) for compensation of the forward voltage of the diode 310. For example, a current 820 is generated to flow through transistors 810 and 812 and a resistor 808, and is mirrored to generate the compensation signal 636 that is combined with the reference signal 696 (e.g., at the summation component 698).

As discussed above and further emphasized here, FIG. 7(A) is merely an example, which should not unduly limit the scope of the claims. One of ordinary skill in the art would recognize many variations, alternatives, and modifications. For example, the sampling-and-compensation component 604 as shown in the FIG. 7(A) is the same as the sampling-and-compensation component 504 as shown in FIG. 5(A). In some embodiments, the sampling-and-compensation component 604 as shown in FIG. 7(A) is connected between the terminal 382 (e.g., terminal CS) and the terminal 380 (e.g., terminal FB) to operate the same as the sampling-and-compensation component 504 as shown in FIG. 5(A).

FIG. 7(B) is a simplified diagram showing certain components of the controller 360 as shown in FIG. 5(B) according to another embodiment of the present invention. This diagram is merely an example, which should not unduly limit the scope of the claims. One of ordinary skill in the art would recognize many variations, alternatives, and modifications.

As shown in FIG. 7(B), the sampling-and-compensation component 604 samples the current sensing signal 398 and generates a compensation signal 636, according to some embodiments. For example, the current sensing signal 398 that increases (e.g., linearly) during an on-time period of the switch 306 is sampled. Particularly, a peak magnitude of the current sensing signal 398 (e.g., at the end of the on-time period) and a medium magnitude of the current sensing signal 398 (e.g., at the middle point of the on-time period) are sampled respectively, and the sampled voltages of the peak magnitude and the medium magnitude are used for compensation of the forward voltage of the diode 310.

According to one embodiment, the peak magnitude of the current sensing signal 398 is sampled and held through a switch 902 and a capacitor 904. For example, when the switch 902 is closed (e.g., being turned on) and another switch 910 is open (e.g., being turned off), the peak magnitude of the current sensing signal 398 is sampled (e.g., close to or at the end of the on-time period) and the capacitor 904 is charged. As an example, a switch 912 is closed (e.g., being turned off) during the sampling of the peak magnitude of the current sensing signal 398 and a capacitor 914 is discharged. In another example, upon the completion of the sampling of the peak magnitude of the current sensing signal 398 (e.g., after the duration of a one-shot pulse), the capacitor 904 provides a signal 926 which has a magnitude equal to the peak magnitude of the current sensing signal 398. In yet another example, upon the completion of the sampling of the peak magnitude of the current sensing signal 398 (e.g., after the duration of a one-shot pulse), the switch 902 is opened (e.g., being turned off), the switch 910 is closed (e.g., being turned on), and the switch 912 is opened (e.g., being turned off). In yet another example, if the capacitor 904 and the capacitor 914 have a same capacitance, the magnitude of a signal 924 that is provided at a non-inverting input terminal (e.g., "+" terminal) of an amplifier 916 is equal to half of the peak magnitude of the current sensing signal 398.

According to one embodiment, the medium magnitude of the current sensing signal 398 is sampled and held through a switch 906 and a capacitor 908. For example, when the switch 906 is closed (e.g., being turned on), the medium magnitude of the current sensing signal 398 is sampled (e.g., close to or at the middle point of the on-time period) and the capacitor 908 is charged. In another example, upon the completion of the sampling of the medium magnitude of the current sensing signal 398 (e.g., after the duration of a one-shot pulse), the capacitor 908 provides a signal 930 which has a magnitude equal to the medium magnitude of the current sensing signal 398. In yet another example, the signal 930 is provided at a non-inverting input terminal (e.g., "+" terminal) of an amplifier 922. In yet another example, a sampling signal corresponding to the middle point of the one-time period is generated based on a comparison of a previous on-time period and the current on-time period. As an example, an initial magnitude ($V_{cs\_0}$) of the current sensing signal 398 (e.g., at the beginning of the on-time period) can be determined as follows:

$$V_{cs\_m} = \frac{1}{2} \times (V_{cs\_0} + V_{cs\_p}) \qquad \text{(Equation 9)}$$

$$V_{cs\_0} = 2 \times \left( V_{cs\_m} - \frac{1}{2} V_{cs\_p} \right)$$

where $V_{cs\_m}$ represents the medium magnitude of the current sensing signal 398 (e.g., the signal 930), and $V_{cs\_p}$ represents the peak magnitude of the current sensing signal 398 (e.g., the signal 926).

According to another embodiment, a proportion amplifier including the amplifier 922 and resistors 918 and 920 generates the compensation signal 636 that is combined with the reference signal 696 (e.g., at the summation component 698) for compensation of the forward voltage of the diode 310. For example, the compensation signal 636 is determined as follows:

$$V_{comp} = \left( V_{cs\_m} + \frac{R_4}{R_3} \times \left( V_{Scs\_m} - \frac{1}{2} \times V_{cs\_p} \right) \right) \qquad \text{(Equation 10)}$$

where $V_{comp}$ represents the compensation signal 636, $R_3$ represents the resistance of the resistor 918, and $R_4$ represents the resistance of the resistor 920. As an example, the compensation signal 636 is proportional to the initial magnitude ($V_{cs\_0}$) of the current sensing signal 398 (e.g., at the beginning of the on-time period). As discussed above and further emphasized here, FIG. 7(B) is merely an example, which should not unduly limit the scope of the claims. One of ordinary skill in the art would recognize many variations, alternatives, and modifications. For example, the sampling-and-compensation component 604 as shown in the FIG. 7(B) is the same as the sampling-and-compensation component 504 as shown in FIG. 5(A). In some embodiments, the sampling-and-compensation component 604 as shown in FIG. 7(B) is connected between the terminal 382 (e.g., terminal CS) and the terminal 380 (e.g., terminal FB) to operate the same as the sampling-and-compensation component 504 as shown in FIG. 5(A).

Referring back to FIG. 3, the fluctuation of the input voltage 198 may cause the primary current 164 and/or the duty cycle of the switch 306 to vary. The smaller the input voltage 198, the slower the primary current 164 increases in magnitude. In turn, the duty cycle of the switch 306 becomes larger, and the initial magnitude of the primary current 164 as the system 100 operates in the CCM mode. The forward voltage of the diode 110 may become larger.

As discussed above and further emphasized here, FIG. 5(B), FIG. 7(A) and FIG. 7(B) are merely examples, which should not unduly limit the scope of the claims. One of ordinary skill in the art would recognize many variations, alternatives, and modifications. For example, instead of sampling the current sensing signal 398, the sampling-and-compensation component 604 is modified to detect an on-time period of the switch 306 and generate the compensation signal 636 according to the duration of the on-time period so that the forward voltage of the diode 310 can be compensated according to the duty cycles.

Figure 8:
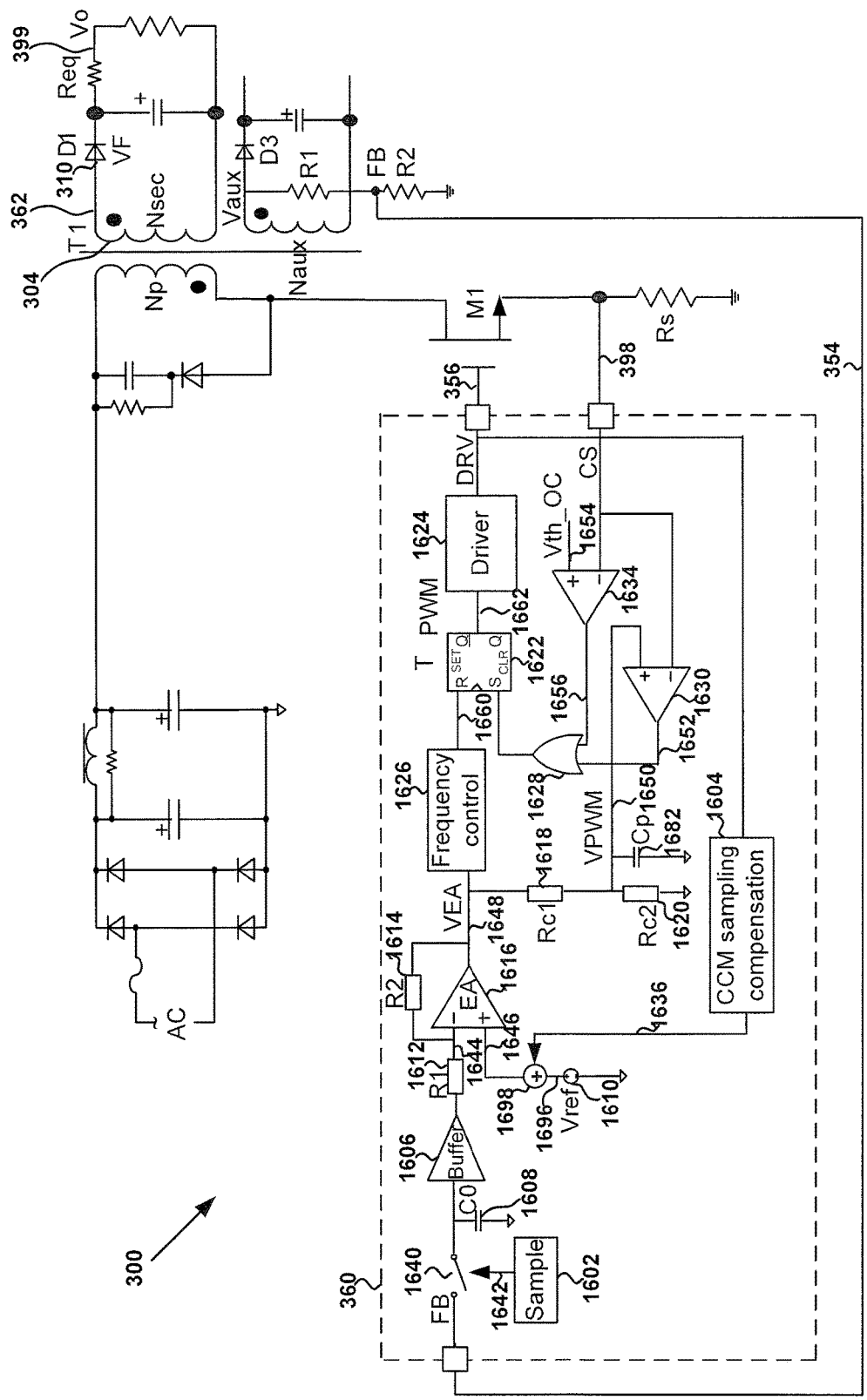
FIG. 8 is a simplified diagram showing a controller as part of the power conversion system as shown in FIG. 4(A) according to another embodiment of the present invention.

FIG. 8 is a simplified diagram showing the controller 360 as part of the power conversion system 300 according to yet another embodiment of the present invention. This diagram is merely an example, which should not unduly limit the scope of the claims. One of ordinary skill in the art would recognize many variations, alternatives, and modifications.

As shown in FIG. 8, the drive signal 356 is sampled by a sampling-and-compensation component 1604 to detect an on-time period of the switch 306 and generate a compensation signal 1636 based at least in part on the on-time period, according to some embodiments. As an example, the compensation signal 1636 includes a voltage signal for compensation of the forward voltage of the diode 310. For example, the compensation signal 1636 is combined with a reference signal 1696 (e.g., at a summation component 1698) to generate a signal 1646 that is provided at a non-inverting input terminal (e.g., "+" terminal) of an error amplifier 1616.

According to one embodiment, the feedback signal 354 is sampled and held through a sampling component 1602, a switch 1640 and a capacitor 1608. For example, when the switch 1640 is closed (e.g., being turned on) in response to a sampling signal 1642 from the sampling component 1602, the feedback signal 354 is sampled. When the switch 1640 is opened (e.g., being turned off) in response to the sampling signal 1642 from the sampling component 1602, the sampled feedback signal 354 is held at the capacitor 1608. In another example, a signal 1644 associated with the feedback signal 354 is provided at an inverting input terminal (e.g., "−" terminal) of the error amplifier 1616. In yet another example, an amplified signal 1648 that indicates the difference between the signal 1644 and the signal 1646 is generated by the error amplifier 1616. As an example, a compensation network that includes resistors 1618 and 1620 and a capacitor 1682 provides a signal 1650 (e.g., $V_{PWM}$) based on the amplified signal 1648. In another example, a comparator 1630 compares the signal 1650 with the current sensing signal 398 and outputs a comparison signal 1652. Another comparator 1634 compares the current sensing signal 398 and a threshold signal 1654 and outputs another comparison signal 1656. In yet another example, a flip-flop component 1622 generates a modulation signal 1662 based on at least information associated with the comparison signals 1652 and 1656 and a frequency control signal 1660 from a frequency control component 1626. In yet another example, a driver component 1624 outputs the drive signal 356 to affect the status of the power switch 306. As an example, a buffer 1606, an OR gate 1628 and resistors 1612 and 1614 are also included in the controller 360. As an example, the system controller 360 changes the drive signal 356 based at least in part on the compensation signal 1636, and accordingly the voltage signal 362 associated with the secondary winding 304 is adjusted to compensate (e.g., partially or completely) for a change in a forward voltage of the rectifying diode 310.

As shown in FIG. 8, the system controller 360 changes the drive signal 356 based at least in part on the compensation signal 1636, and accordingly the voltage signal 362 associated with the secondary winding 304 is adjusted to compensate (e.g., partially or completely) for a change in a forward voltage of the rectifying diode 310 according to certain embodiments. For example, if the forward voltage of the rectifying diode 310 becomes larger, the system controller 360 changes the drive signal 356 so that the voltage signal 362 also increases. In another example, this increase in the voltage signal 362 compensates (e.g., partially or completely) for the increase in the forward voltage of the rectifying diode 310. In yet another example, this increase in the voltage signal 362 completely compensates for the increase in the forward voltage of the rectifying diode 310 so that the output voltage 399 of the power conversion system 300 does not change despite the increase in the forward voltage of the rectifying diode 310.

Figure 9:
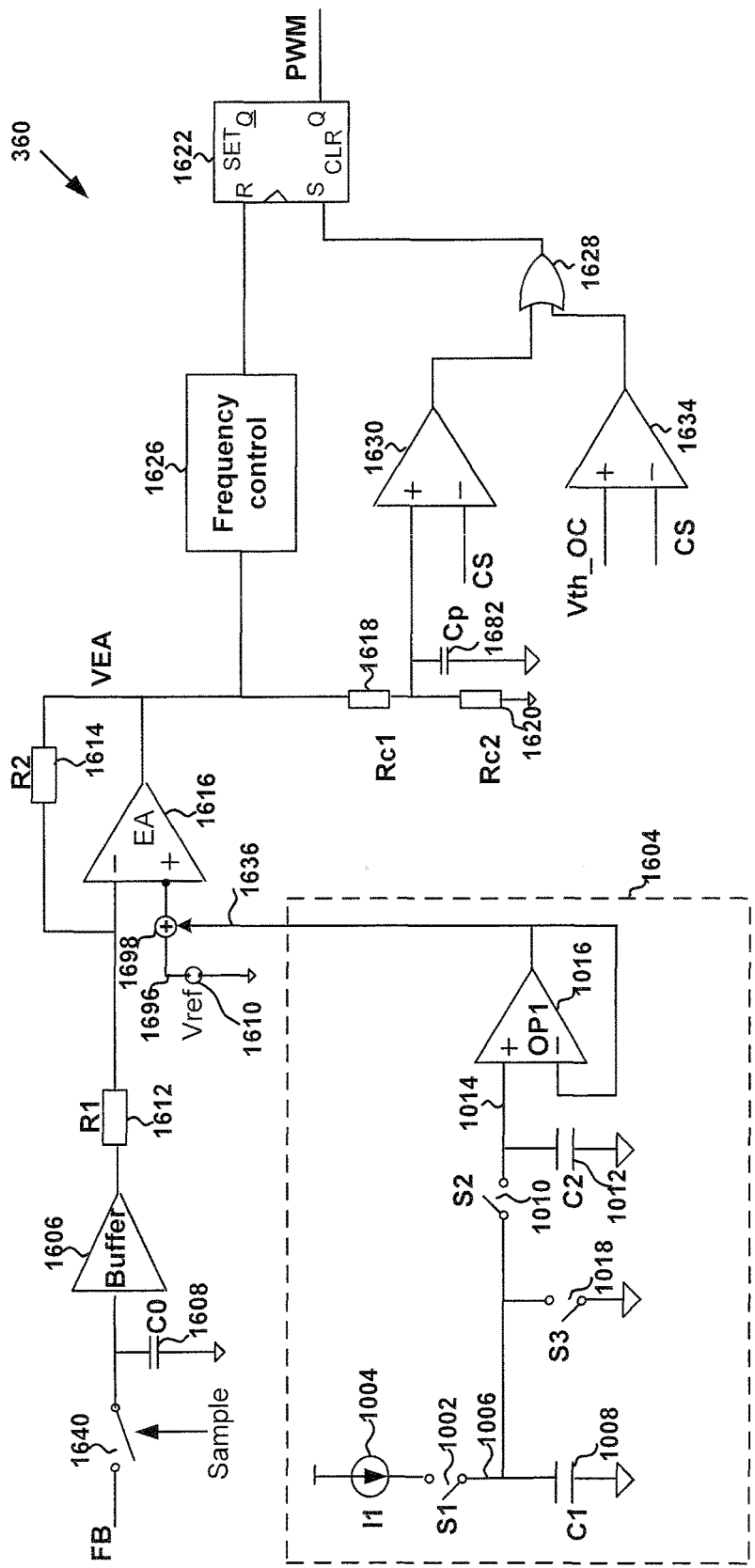
FIG. 9 is a simplified diagram showing certain components of the controller as shown in FIG. 8 according to yet another embodiment of the present invention.

FIG. 9 is a simplified diagram showing certain components of the controller 360 as shown in FIG. 8 according to yet another embodiment of the present invention. This diagram is merely an example, which should not unduly limit the scope of the claims. One of ordinary skill in the art would recognize many variations, alternatives, and modifications.

As shown in FIG. 9, the sampling-and-compensation component 1604 detects an on-time period of the switch 306 based at least in part on the drive signal 356 and generates the compensation signal 1636 according to the duration of the on-time period, according to some embodiments. For example, during the on-time period of the switch 306, a switch 1002 is closed (e.g., being turned on), and a current source component 1004 charges a capacitor 1008 to generate a voltage signal 1006 that corresponds to the duration of the on-time period of the switch 306. In another example, during an off-time period of the switch 306 that follows immediately the on-time period, the switch 1002 is opened (e.g., being turned off), and a switch 1010 is closed (e.g., being turned on) for a short time period (e.g., 100 ns-200 ns) to charge a capacitor 1012 to generate a voltage signal 1014. In yet another example, the switch 1010 is closed (e.g., being turned on) in response to a pulse signal with a pulse width of 100 ns-200 ns. In yet another example, the voltage signal 1006 is changed (e.g., in magnitude) during the short time period when the switch 1010 is closed. In yet another example, an amplifier 1016 receives the voltage signal 1014 at a non-inverting input terminal (e.g., "+" terminal) and outputs the compensation signal 1636 to be combined with the references signal 1696 (e.g., at the summation component 1698) for compensation of the forward voltage of the diode 310. In yet another example, at the beginning of a next on-time period (e.g., a rising edge of the drive signal 356), a switch 1018 is closed (e.g., being turned on) for a short time period (e.g., 100 ns-200 ns) to discharge the capacitor 1008 so that the voltage signal 1006 decreases in magnitude (e.g., to 0). In yet another example, the switch 1018 is closed (e.g., being turned on) in response to a pulse signal with a pulse width of 100 ns-200 ns.

As discussed above and further emphasized here, FIG. 9 is merely an example, which should not unduly limit the scope of the claims. One of ordinary skill in the art would recognize many variations, alternatives, and modifications. For example, the sampling-and-compensation component 1604 as shown in the FIG. 9 is the same as the sampling-and-compensation component 504 as shown in FIG. 5(A). In some embodiments, the sampling-and-compensation component 1604 as shown in FIG. 9 is connected between the terminal 382 (e.g., terminal CS) and the terminal 380 (e.g., terminal FB) to operate the same as the sampling-and-compensation component 504 as shown in FIG. 5(A).

Figure 10:
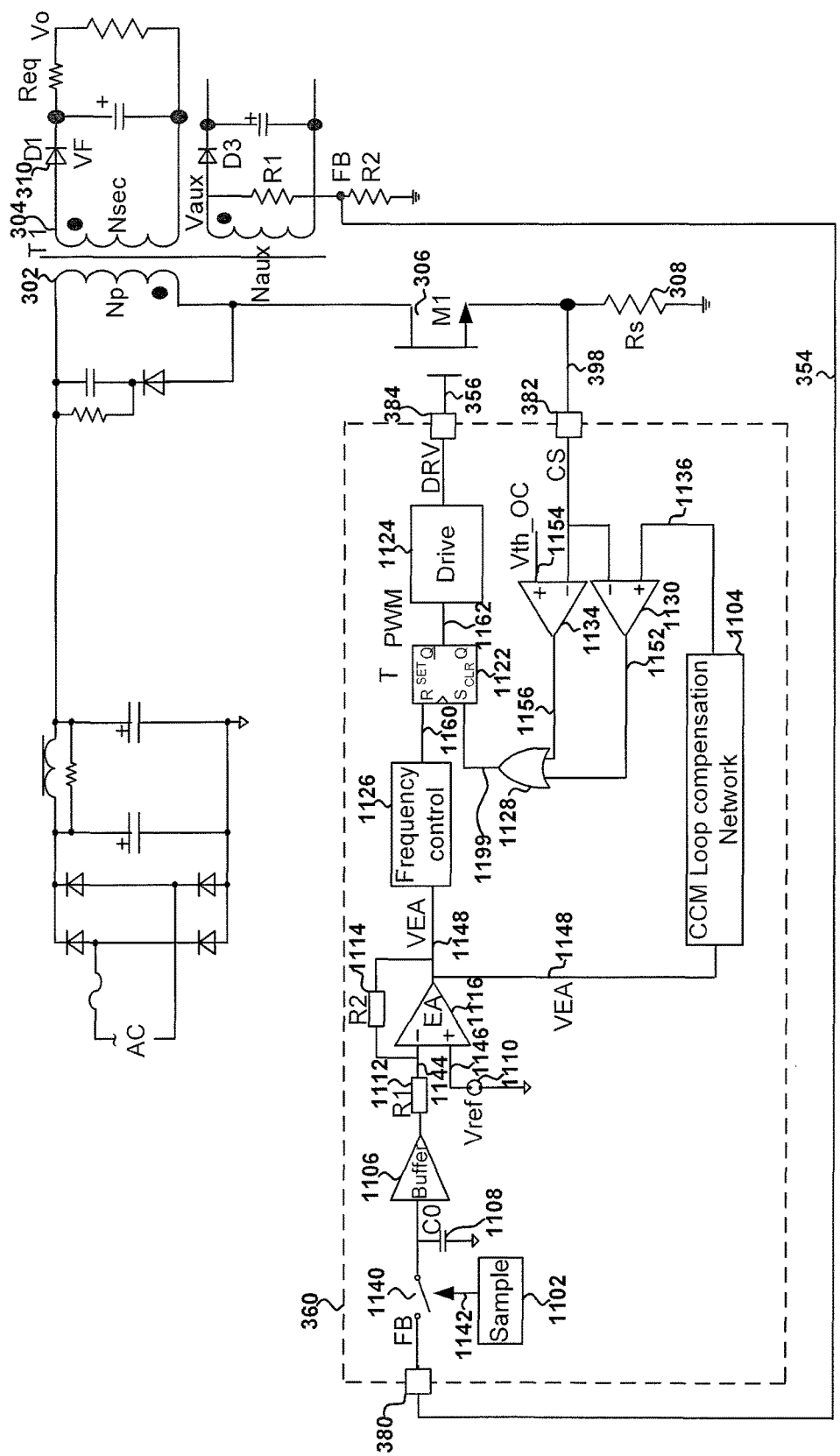
FIG. 10 is a simplified diagram showing the controller as part of the power conversion system as shown in FIG. 4(A) according to yet another embodiment of the present invention.

FIG. 10 is a simplified diagram showing the controller 360 as part of the power conversion system 300 according to yet another embodiment of the present invention. This diagram is merely an example, which should not unduly limit the scope of the claims. One of ordinary skill in the art would recognize many variations, alternatives, and modifications.

As shown in FIG. 10, a compensation network 1104 is used to introduce one or more low frequency poles to regulate (e.g., reduce) system bandwidth, according to certain embodiments. For example, the feedback signal 354 is sampled and held through a sampling component 1102, a switch 1140 and a capacitor 1108, according to some embodiments. In another example, when the switch 1140 is closed (e.g., being turned on) in response to a sampling signal 1142 from the sampling component 1102, the feedback signal 354 is sampled. When the switch 1140 is opened (e.g., being turned off) in response to the sampling signal 1142 from the sampling component 1102, the feedback signal 354 is held at the capacitor 1108. In yet another example, a signal 1144 associated with the feedback signal 354 is provided at an inverting input terminal (e.g., "−" terminal) of an error amplifier 1116, and a reference signal 1146 is provided by a reference signal generator 1110 at a non-inverting input terminal (e.g., "+" terminal) of the error amplifier 1116. As an example, an amplified signal 1148 that indicates the difference between the signal 1144 and the reference signal 1146 is generated by the error amplifier 1116. As another example, the compensation network 1104 generates a compensation signal 1136 that is compared with the current sensing signal 398 by a comparator 1130. The comparator 1130 outputs a comparison signal 1152. Another comparator 1134 compares the current sensing signal 398 and a threshold signal 1154 and outputs another comparison signal 1156. In yet another example, the OR gate 1128 receives the comparison signals 1152 and 1156 and outputs a signal 1199. In yet another example, a flip-flop component 1122 generates a modulation signal 1162 based on at least information associated with the signal 1199 and a frequency control signal 1160 from a frequency control component 1126. In yet another example, a driver component 1124 outputs the drive signal 356 to affect the status of the power switch 306. As an example, a buffer 1106, an OR gate 1128 and resistors 1112 and 1114 are also included in the controller 360.

According to certain embodiments, the compensation network 1104 includes two resistors and a capacitor, similar to the compensation network as shown in FIG. 5(A) that includes the resistors 518 and 520 and the capacitor 582 or the compensation network as shown in FIG. 5(B) that includes the resistors 618 and 620 and the capacitor 682. For example, the compensation signal 1136 is determined as follows:

$$\frac{V_a}{V_{EA}} = \frac{R_{c2}}{R_{c1} + R_{c2}} \times \frac{1}{1 + \frac{R_{c1} \times R_{c2}}{R_{c1} + R_{c2}} \times S \times C_p} \quad \text{(Equation 11)}$$

where $V_a$ represents the compensation signal 1136, and $V_{EA}$ represents the amplified signal 1148. In addition, $R_{c1}$, $R_{c2}$ and $C_p$ represent the resistors and the capacitor respectively. The resistors and the capacitor (e.g., similar to the resistors 518 and 520 and the capacitor 582 as shown in FIG. 5(A) or the resistors 618 and 620 and the capacitor 682 as shown in FIG. 5(B)) form a pole, according to some embodiments.

Figure 11:
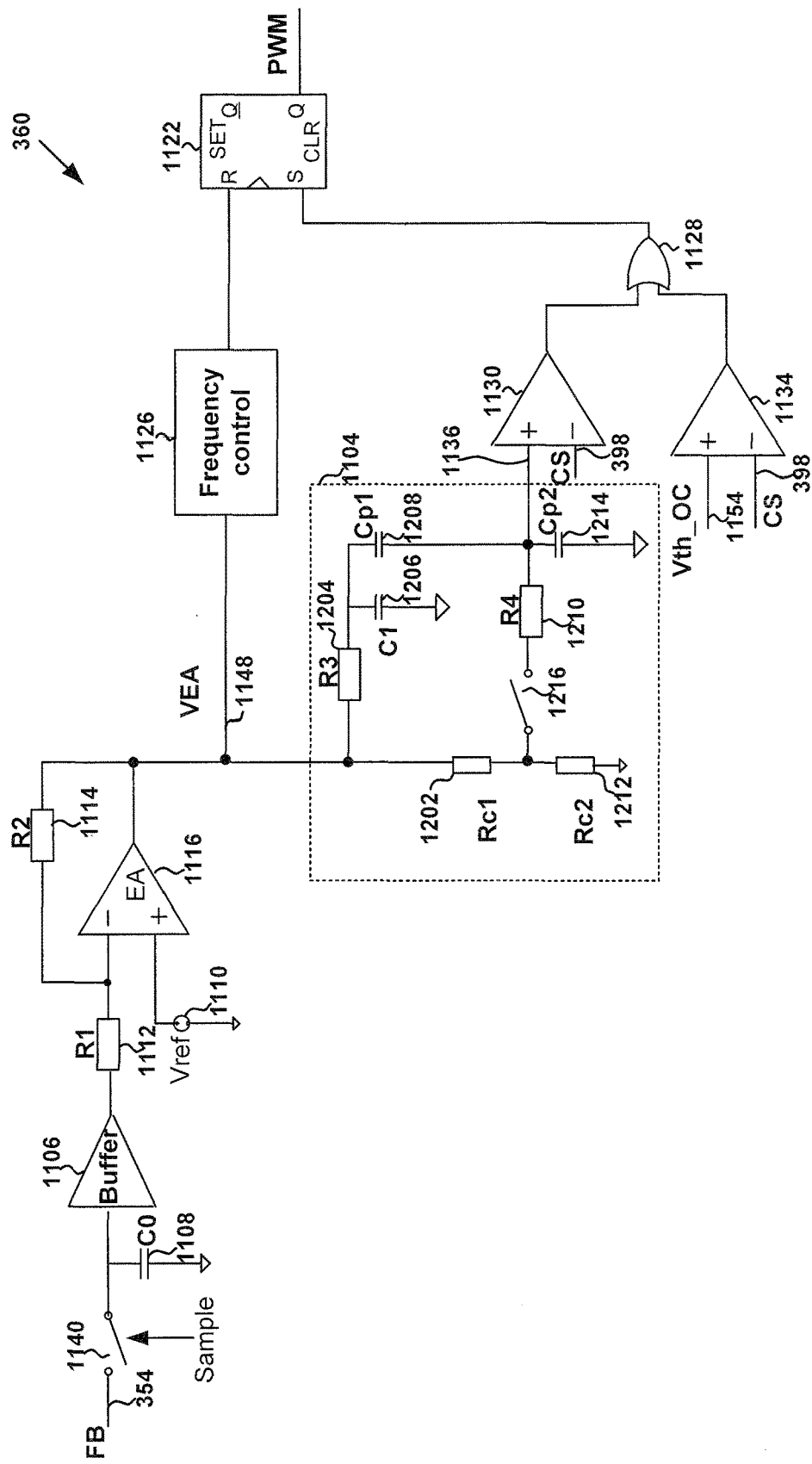
FIG. 11 is a simplified diagram showing certain components of the controller as shown in FIG. 10 according to one embodiment of the present invention.

FIG. 11 is a simplified diagram showing certain components of the controller 360 as shown in FIG. 10 according to one embodiment of the present invention. This diagram is merely an example, which should not unduly limit the scope of the claims. One of ordinary skill in the art would recognize many variations, alternatives, and modifications. The compensation network 1104 includes resistors 1202, 1204, 1210 and 1212, capacitors 1206, 1208, 1214, and a switch 1216.

According to one embodiment, the switch 1216 is closed (e.g., being turned on) for a particular time period (e.g., 1 μs) during each switching period of the switch 306. For example, the capacitance of the capacitor 1214 is smaller than the capacitance of the capacitor 582 and the capacitance of the capacitor 682. As an example, the capacitor 1208 is used to introduce a compensation zero point for feed-forward compensation. As another example, a RC filter that includes the resistor 1204 and the capacitor 1206 processes the amplified signal 1148 so as to reduce the effects of high frequency noises on the capacitor 1214. As yet another example, the capacitance of the capacitor 1208 is smaller than the capacitance of the capacitor 1214. As yet another example, the capacitance of the capacitor 1206 is smaller than the capacitance of the capacitor 1208. As yet another example, a feed-forward component that includes the resistor 1204 and the capacitors 1206, 1208, and 1214 receives the amplified signal 1148 and output a first voltage. As yet another example, a low-pass filter that includes the resistors 1202, 1210 and 1212 and the capacitor 1214 receives the amplified signal 1148 and output a second voltage. As yet another example, the compensation signal 1136 is equal to a combination of the first voltage and the second voltage.

As discussed above and further emphasized here, FIGS. 5(A) and 4(B) are merely examples, which should not unduly limit the scope of the claims. One of ordinary skill in the art would recognize many variations, alternatives, and modifications. For example, the resistors 518 and 520 and the capacitor 582 as shown in FIG. 5(A) are replaced by the compensation network 1104 as shown in FIG. 8, and the compensation network 1104 is connected between the output of the error amplifier 516 and an inverting input terminal of the comparator 530 as shown in FIG. 5(A). In another example, the resistors 618 and 620 and the capacitor 682 as shown in FIG. 5(B) are replaced by the compensation network 1104 as shown in FIG. 8, and the compensation network 1104 is connected between the output of the error amplifier 616 and an inverting input terminal of the comparator 630 as shown in FIG. 5(B).

According one embodiment, a system controller includes: a first sampling component configured to sample a sensing signal and determine a compensation signal based on at least in part on the sensing signal, the sensing signal being associated with a first current flowing through a primary winding of a power conversion system; a signal processing component configured to receive a feedback signal and the compensation signal and generate a first signal based at least in part on the feedback signal and the compensation signal, the feedback signal being associated with an auxiliary winding coupled with a secondary winding of the power conversion system; an error amplifier configured to receive the first signal and a reference signal and generate an amplified signal based at least in part on the first signal and the reference signal; a modulation component configured to receive the amplified signal and generate a modulation signal based at least in part on the amplified signal; and a driver component configured to receive the modulation signal and output a drive signal based at least in part on the modulation signal to close or open a first switch to affect the first current. The system controller is configured to change the drive signal based on at least information associated with the compensation signal in order to adjust a winding voltage of the secondary winding and to at least partially compensate for a change in a forward voltage of a rectifying diode associated with the secondary winding. For example, the system controller is implemented according to at least FIG. 5(A) and/or FIG. 6.

According to another embodiment, a system controller includes: a first sampling component configured to sample a sensing signal and determine a compensation signal based on at least in part on the sensing signal, the sensing signal being associated with a first current flowing through a primary winding of a power conversion system; a summation component configured to receive the compensation signal and a reference signal and generate a first signal based at least in part on the compensation signal and a reference signal, the first signal being related to a combination of the compensation signal and the reference signal; an error amplifier configured to receive the first signal and a second signal and generate an amplified signal based at least in part on the first signal and the second signal, the second signal being related to a feedback signal associated with an auxiliary winding coupled with a secondary winding of the power conversion system; a modulation component configured to receive the amplified signal and generate a modulation signal based at least in part on the amplified signal; and a driver component configured to receive the modulation signal and generate a drive signal based at least in part on the modulation signal to close or open a first switch to affect the first current. The system controller is configured to change the drive signal based on at least information associated with the compensation signal in order to adjust a winding voltage of the secondary winding and to at least partially compensate for a change in a forward voltage of a rectifying diode associated with the secondary winding. For example, the system controller is implemented according to at least FIG. 5(B), FIG. 7(A), and/or FIG. 7(B).

According to yet another embodiment, a system controller includes: a compensation component configured to generate a compensation signal based at least in part on an on-time period associated with a first switch of a power conversion system, the first switch being closed during the on-time period; a summation component configured to receive the compensation signal and a reference signal and generate a first signal based at least in part on the compensation signal and a reference signal, the first signal being related to a combination of the compensation signal and the reference signal; an error amplifier configured to receive the first signal and a second signal and generate an amplified signal based at least in part on the first signal and the second signal, the second signal being related to a feedback signal associated with an auxiliary winding coupled with a secondary winding of the power conversion system; a modulation component configured to receive the amplified signal and generate a modulation signal based at least in part on the amplified signal; and a driver component configured to receive the modulation signal and output a drive signal based at least in part on the modulation signal to close or open a first switch to affect a first current flowing through a primary winding of the power conversion system. The system controller is configured to change the drive signal based on at least information associated with the compensation signal in order to adjust a winding voltage of the secondary winding and to at least partially compensate for a change in a forward voltage of a rectifying diode associated with the secondary winding. For example, the system controller is implemented according to at least FIG. 8 and/or FIG. 9.

In one embodiment, a system controller includes: an error amplifier configured to receive a first signal and a reference signal and generate an amplified signal based at least in part on the first signal and the reference signal, the first signal being related to a feedback signal associated with an auxiliary winding coupled with a secondary winding of a power conversion system; a feed-forward component configured to receive the amplified signal and generate a first voltage based at least in part on the amplified signal; a low-pass filter configured to receive the amplified signal and generate a second voltage based at least in part on the amplified signal; a modulation component configured to receive a compensation signal and a sensing signal and generate a modulation signal based at least in part on the compensation signal and the sensing signal, the compensations signal being related to a combination of the first voltage and the second voltage; and a driver component configured to receive the modulation signal and generate a drive signal based at least in part on the modulation signal to close or open a switch to affect the first current. For example, the system controller is implemented according to at least FIG. 8 and/or FIG. 9.

In another embodiment, a method for a power conversion system includes: sampling a sensing signal, the sensing signal being associated with a first current flowing through a primary winding of a power conversion system; determining a compensation signal based on at least in part on the sensing signal; receiving a feedback signal and the compensation signal, the feedback signal being associated with an auxiliary winding coupled with a secondary winding of the power conversion system; generating a first signal based at least in part on the feedback signal and the compensation signal; receiving the first signal and a reference signal; generating an amplified signal based at least in part on the first signal and the reference signal; receiving the amplified signal; generating a modulation signal based at least in part on the amplified signal; receiving the modulation signal; and outputting a drive signal based at least in part on the modulation signal to close or open a first switch to affect the first current. The outputting a drive signal based at least in part on the modulation signal to close or open a first switch to affect the first current includes: changing the drive signal based on at least information associated with the compensation signal in order to adjust a winding voltage of the secondary winding and to at least partially compensate for a change in a forward voltage of a rectifying diode associated with the secondary winding. For example, the method is implemented according to at least FIG. 5(A) and/or FIG. 6.

In yet another embodiment, a method for a power conversion system includes: sampling a sensing signal, the sensing signal being associated with a first current flowing through a primary winding of a power conversion system; determining a compensation signal based on at least in part on the sensing signal; receiving the compensation signal and a reference signal; generating a first signal based at least in part on the compensation signal and a reference signal, the first signal being related to a combination of the compensation signal and the reference signal; receiving the first signal and a second signal, the second signal being related to a feedback signal associated with an auxiliary winding coupled with a secondary winding of the power conversion system; generating an amplified signal based at least in part on the first signal and the second signal; receiving the amplified signal; generating a modulation signal based at least in part on the amplified signal; receiving the modulation signal; and outputting a drive signal based at least in part on the modulation signal to close or open a first switch to affect the first current. The outputting a drive signal based at least in part on the modulation signal to close or open a first switch to affect the first current includes: changing the drive signal based on at least information associated with the compensation signal in order to adjust a winding voltage of the secondary winding and to at least partially compensate for a change in a forward voltage of a rectifying diode associated with the secondary winding. For example, the method is implemented according to at least FIG. 5(B), FIG. 7(A), and/or FIG. 7(B).

According to one embodiment, a method for a power conversion system includes: determining a compensation signal based on at least in part on an on-time period associated with a first current flowing through a primary winding of a power conversion system; receiving the compensation signal and a reference signal; generating a first signal based at least in part on the compensation signal and a reference signal, the first signal being related to a combination of the compensation signal and the reference signal; receiving the first signal and a second signal, the second signal being related to a feedback signal associated with an auxiliary winding coupled with a secondary winding of the power conversion system; generating an amplified signal based at least in part on the first signal and the second signal; receiving the amplified signal; generating a modulation signal based at least in part on the amplified signal; receiving the modulation signal; and outputting a drive signal based at least in part on the modulation signal to close or open a first switch to affect the first current, the first switch being closed during the on-time period. The outputting a drive signal based at least in part on the modulation signal to close or open a first switch to affect the first current includes: changing the drive signal based on at least information associated with the compensation signal in order to adjust a winding voltage of the secondary winding and to at least partially compensate for a change in a forward voltage of a rectifying diode associated with the secondary winding. For example, the method is implemented according to at least FIG. 8 and/or FIG. 9.

According to another embodiment, a method for a power conversion system includes: receiving a first signal and a reference signal, the first signal being related to a feedback signal associated with an auxiliary winding coupled with a secondary winding of a power conversion system; generating an amplified signal based at least in part on the first signal and the reference signal; receiving the amplified signal; generating a first voltage based at least in part on the amplified signal; receiving the amplified signal; generating a second voltage based at least in part on the amplified signal; receiving a compensation signal and a sensing signal, the compensations signal being related to a combination of the first voltage and the second voltage; generating a modulation signal based at least in part on the compensation signal and the sensing signal; receiving the modulation signal; and generating a drive signal based at least in part on the modulation signal to close or open a switch to affect the first current. For example, the method is implemented according to at least FIG. 8 and/or FIG. 9.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for a power converter, the system comprising:
    a compensation signal generator configured to sample a sensing signal and generate a compensation signal based at least in part on the sensing signal, the sensing signal being associated with a first current flowing through a primary winding of a power converter;
    a first signal generator configured to receive a feedback signal and the compensation signal and generate a first signal based at least in part on the feedback signal and the compensation signal, the feedback signal being associated with an auxiliary winding coupled with a secondary winding of the power converter;
    an error amplifier configured to receive the first signal and a reference signal and generate an amplified signal based at least in part on the first signal and the reference signal; and
    a drive signal generator configured to receive the amplified signal and generate a drive signal based at least in part on the amplified signal to close or open a first switch to affect the first current;
    wherein the system is configured to change the drive signal based at least in part on the compensation signal in order to adjust a winding voltage of the secondary winding and to at least partially compensate for a change in a forward voltage of a rectifying diode associated with the secondary winding.

2. The system of claim 1 wherein:
    the compensation signal generator is connected to a resistor network and configured to output the compensation signal.

3. The system of claim 2 wherein:
    the resistor network includes a first resistor and a second resistor;
    a first resistor terminal of the first resistor is connected to a second resistor terminal of the second resistor;
    a third resistor terminal of the first resistor is connected to the auxiliary winding; and
    the second resistor terminal is further configured to receive the compensation signal.

4. The system of claim 1 wherein the first signal generator includes:
    a sample-and-hold signal generator configured to sample and hold the feedback signal and the compensation signal and output a sampled-and-held signal based at least in part on the feedback signal and the compensation signal; and
    a second signal generator configured to receive the sampled-and-held signal and output the first signal based at least in part on the sampled-and-held signal.

5. The system of claim 4 wherein the sample-and-hold signal generator includes:
a third signal generator configured to generate a second signal;
a second switch configured to close or open in response to the second signal; and
a capacitor configured to receive the feedback signal and the compensation signal in response to the second switch being closed and provide the sampled-and-held signal.

6. The system of claim 4, and further comprising:
a first resistor including a first resistor terminal and a second resistor terminal;
wherein:
the first resistor terminal is connected to an inverting input terminal of the error amplifier; and
the second resistor terminal is connected to an output terminal of the error amplifier.

7. The system of claim 1 wherein the drive signal generator includes:
a frequency regulation signal generator configured to receive the amplified signal and generate a frequency regulation signal based at least in part on the amplified signal; and
a flip-flop configured to receive the frequency regulation signal and generate a modulation signal based at least in part on the frequency regulation signal.

8. The system of claim 7 wherein the drive signal generator further includes:
a first comparator configured to receive the sensing signal and a threshold signal and generate a first comparison signal based at least in part on the sensing signal and the threshold signal;
a compensation network configured to receive the amplified signal and generate a second signal based at least in part on the amplified signal;
a second comparator configured to receive the sensing signal and the second signal and generate a second comparison signal based at least in part on the sensing signal and the second signal; and
an OR gate configured to receive the first comparison signal and the second comparison signal and output a third signal based at least in part on the first comparison signal and the second comparison signal to the flip-flop.

9. The system of claim 8 wherein the compensation network includes:
a first resistor including a first resistor terminal and a second resistor terminal;
a second resistor including a third resistor terminal and a fourth resistor terminal; and
a capacitor including a first capacitor terminal and a second capacitor terminal;
wherein:
the first resistor terminal is configured to receive the amplified signal; and
the second resistor terminal is connected to the third resistor terminal and the first capacitor terminal configured to provide the second signal.

10. The system of claim 1 wherein the compensation signal generator includes:
a sample-and-hold signal generator configured to sample and hold the sensing signal and provide a sampled-and-held signal;
an amplifier configured to receive the sampled-and-held signal and generate an output signal based at least in part on the sampled-and-held signal;

a current generator configured to generate a second current based at least in part on the output signal; and
a current mirror circuit configured to generate the compensation signal based at least in part on the second current.

11. The system of claim 10 wherein the sample-and-hold signal generator includes:
a second signal generator configured to generate a second signal;
a second switch configured to close or open in response to the second signal; and
a capacitor configured to receive the sensing signal in response to the second switch being closed and provide the sampled-and-held signal.

12. The system of claim 10 wherein the current generator includes:
a transistor including a first transistor terminal, a second transistor terminal and a third transistor terminal; and
a resistor including a first resistor terminal and a second resistor terminal;
wherein:
the amplifier includes an inverting input terminal and a non-inverting input terminal;
the first transistor terminal is configured to receive the output signal;
the second transistor terminal is connected to the first resistor terminal and the inverting input terminal; and
the third transistor terminal is connected to the current mirror circuit.

13. The system of claim 10 wherein the current mirror circuit includes:
a first transistor including a first transistor terminal, a second transistor terminal and a third transistor terminal; and
a second transistor including a fourth transistor terminal, a fifth transistor terminal and a sixth transistor terminal;
wherein:
the first transistor terminal is connected to the fourth transistor terminal;
the second transistor terminal is connected to the fifth transistor terminal;
the third transistor terminal is connected to the current generator and the second transistor terminal; and
the sixth transistor terminal is configured to provide the compensation signal.

14. The system of claim 1 is further configured to change the drive signal based at least in part on the compensation signal in order to completely compensate for the change in the forward voltage of the rectifying diode.

15. A system for a power converter, the system comprising:
a compensation signal generator configured to sample a sensing signal and determine a compensation signal based at least in part on the sensing signal, the sensing signal being associated with a first current flowing through a primary winding of a power converter;
a combination signal generator configured to receive the compensation signal and a reference signal and generate a first signal based at least in part on the compensation signal and the reference signal, the first signal being related to a combination of the compensation signal and the reference signal;
an error amplifier configured to receive the first signal and a second signal and generate an amplified signal based at least in part on the first signal and the second signal, the second signal being related to a feedback signal associated with an auxiliary winding coupled with a secondary winding of the power converter; and a drive signal generator configured to receive the amplified signal and generate a drive signal based at least in part on the amplified signal to close or open a first switch to affect the first current;

wherein the system is configured to change the drive signal based at least in part on the compensation signal in order to adjust a winding voltage of the secondary winding and to at least partially compensate for a change in a forward voltage of a rectifying diode associated with the secondary winding.

16. The system of claim 15 wherein the drive signal generator includes:
a frequency regulation signal generator configured to receive the amplified signal and generate a frequency regulation signal based at least in part on the amplified signal; and
a flip-flop configured to receive the frequency regulation signal and generate a modulation signal based at least in part on the frequency regulation signal.

17. The system of claim 15 wherein the drive signal generator further includes:
a first comparator configured to receive the sensing signal and a threshold signal and generate a first comparison signal based at least in part on the sensing signal and the threshold signal;
a compensation network configured to receive the amplified signal and generate a third signal based at least in part on the amplified signal;
a second comparator configured to receive the sensing signal and the third signal and generate a second comparison signal based at least in part on the sensing signal and the third signal; and
an OR gate configured to receive the first comparison signal and the second comparison signal and output a fourth signal based at least in part on the first comparison signal and the second comparison signal to a flip-flop.

18. The system of claim 17 wherein the compensation network includes:
a first resistor including a first resistor terminal and a second resistor terminal;
a second resistor including a third resistor terminal and a fourth resistor terminal; and
a capacitor including a first capacitor terminal and a second capacitor terminal;
wherein:
the first resistor terminal is configured to receive the amplified signal; and
the second resistor terminal is connected to the third resistor terminal and the first capacitor terminal configured to provide the third signal.

19. The system of claim 15 wherein the compensation signal generator includes:
a sample-and-hold signal generator configured to sample and hold the sensing signal and provide a sampled-and-held signal;
an amplifier configured to receive the sampled-and-held signal and generate an output signal based at least in part on the sampled-and-held signal;
a current generator configured to generate a second current based at least in part on the output signal; and
a current mirror circuit configured to generate the compensation signal based at least in part on the second current.

20. The system of claim 19 wherein the sample-and-hold signal generator includes:
a first signal generator configured to generate a third signal;
a second switch configured to close or open in response to the third signal; and
a capacitor configured to receive the sensing signal in response to the second switch being closed and provide the sampled-and-held signal.

21. The system of claim 20 wherein the current generator includes:
a transistor including a first transistor terminal, a second transistor terminal and a third transistor terminal; and
a resistor including a first resistor terminal and a second resistor terminal;
wherein:
the amplifier includes an inverting input terminal and a non-inverting input terminal;
the first transistor terminal is configured to receive the output signal;
the second transistor terminal is connected to the first resistor terminal and the inverting input terminal; and
the third transistor terminal is connected to the current mirror circuit.

22. The system of claim 20 wherein the current mirror circuit includes:
a first transistor including a first transistor terminal, a second transistor terminal and a third transistor terminal; and
a second transistor including a fourth transistor terminal, a fifth transistor terminal and a sixth transistor terminal;
wherein:
the first transistor terminal is connected to the fourth transistor terminal;
the second transistor terminal is connected to the fifth transistor terminal;
the third transistor terminal is connected to the current generator and the second transistor terminal; and
the sixth transistor terminal is configured to provide the compensation signal.

23. The system of claim 15, and further comprising:
a first signal generator configured to receive the feedback signal and generate the second signal based at least in part on the feedback signal.

24. The system of claim 23 wherein the first signal generator includes:
a sample-and-hold signal generator configured to sample and hold the feedback signal and output a sampled-and-held signal based at least in part on the feedback signal; and
a second signal generator configured to receive the sampled-and-held signal and output the second signal based at least in part on the sampled-and-held signal.

25. The system of claim 24, and further comprising:
a first resistor including a first resistor terminal and a second resistor terminal;
wherein:
the first resistor terminal is connected to an inverting input terminal of the error amplifier; and
the second resistor terminal is connected to an output terminal of the error amplifier;
wherein:
the second signal generator includes:
a buffer configured to receive the sampled-and-held signal and generate a buffered signal based at least in part on the sampled-and-held signal; and a second resistor including a third resistor terminal and a fourth resistor terminal;

wherein:
the third resistor terminal is connected to the buffer; and
the fourth resistor terminal is connected to the first resistor terminal.

26. The system of claim 24 wherein the sample-and-hold signal generator includes:
a third signal generator configured to generate a third signal;
a second switch configured to close or open in response to the third signal; and
a capacitor configured to receive the sensing signal in response to the second switch being closed and provide the sampled-and-held signal.

27. The system of claim 15 is further configured to change the drive signal based at least in part on the compensation signal in order to completely compensate for the change in the forward voltage of the rectifying diode.

28. The system of claim 15 wherein the compensation signal generator includes:
a first sample-and-hold signal generator configured to sample a first value of the sensing signal during a sampling period and generate a first sampled-and-held signal;
a first amplifier configured to receive the first sampled-and-held signal and generate a third signal based at least in part on the first sampled-and-held signal;
a second sample-and-hold signal generator configured to sample a second value of the sensing signal during the sampling period and generate a second sampled-and-held signal; and
a second amplifier configured to receive a fourth signal associated with the third signal and the second sampled-and-held signal and generate the compensation signal based at least in part on the fourth signal and the second sampled-and-held signal.

29. The system of claim 28 wherein:
the first value is a peak value of the sensing signal; and
the first sampled-and-held signal equals in magnitude to half of the peak value.

30. The system of claim 28 wherein:
the second value is a middle value of the sensing signal, the middle value corresponding to a middle point of the sampling period; and
the second sampled-and-held signal equals in magnitude to the middle value.

31. The system of claim 28 wherein the first sample-and-hold signal generator includes:
a second switch configured to be closed during the sampling period and opened during a holding period that follows the sampling period;
a third switch configured to be opened during the sampling period and be closed during the holding period;
a fourth switch configured to be closed during the sampling period and be opened during the holding period;
a first capacitor configured to receive the sensing signal in response to the second switch being closed and provide an intermediate signal; and
a second capacitor configured to receive the intermediate signal in response to the third switch being closed and the fourth switch being opened and provide the first sampled-and-held signal in response to the fourth switch being opened.

32. The system of claim 30 wherein the second sample-and-hold signal generator includes:

a second switch configured to be closed at the middle point of the sampling period in response to a sampling signal; and
a capacitor configured to receive the sensing signal in response to the second switch being closed and provide the second sampled-and-held signal.

33. A method for a power converter, the method comprising:
sampling a sensing signal, the sensing signal being associated with a first current flowing through a primary winding of a power converter;
determining a compensation signal based at least in part on the sensing signal;
receiving a feedback signal and the compensation signal, the feedback signal being associated with an auxiliary winding coupled with a secondary winding of the power converter;
generating a first signal based at least in part on the feedback signal and the compensation signal;
receiving the first signal and a reference signal;
generating an amplified signal based at least in part on the first signal and the reference signal;
receiving the amplified signal; and
outputting a drive signal based at least in part on the amplified signal to close or open a switch to affect the first current;
wherein the outputting a drive signal based at least in part on the amplified signal to close or open a switch to affect the first current includes:
changing the drive signal based at least in part on the compensation signal in order to adjust a winding voltage of the secondary winding and to at least partially compensate for a change in a forward voltage of a rectifying diode associated with the secondary winding.

34. The method of claim 33 wherein the generating a first signal based at least in part on the feedback signal and the compensation signal includes:
sampling and holding the feedback signal and the compensation signal;
outputting a sampled-and-held signal based at least in part on the feedback signal and the compensation signal;
receiving the sampled-and-held signal; and
outputting the first signal based at least in part on the sampled-and-held signal.

35. The method of claim 33 wherein the sampling a sensing signal includes:
sampling and holding the sensing signal;
providing a sampled-and-held signal;
receiving the sampled-and-held signal;
generating an output signal based at least in part on the sampled-and-held signal;
generating a second current based at least in part on the output signal; and
generating the compensation signal based at least in part on the second current.

36. The method of claim 33 wherein the outputting a drive signal based at least in part on the amplified signal to close or open a switch to affect the first current includes:
changing the drive signal based at least in part on the compensation signal in order to completely compensate for the change in the forward voltage of the rectifying diode.

37. A method for a power converter, the method comprising:

sampling a sensing signal, the sensing signal being associated with a first current flowing through a primary winding of a power converter;
determining a compensation signal based at least in part on the sensing signal;
receiving the compensation signal and a reference signal;
generating a first signal based at least in part on the compensation signal and the reference signal, the first signal being related to a combination of the compensation signal and the reference signal;
receiving the first signal and a second signal, the second signal being related to a feedback signal associated with an auxiliary winding coupled with a secondary winding of the power converter;
generating an amplified signal based at least in part on the first signal and the second signal; and
outputting a drive signal based at least in part on the amplified signal to close or open a switch to affect the first current;
wherein the outputting a drive signal based at least in part on the amplified signal to close or open a switch to affect the first current includes:
changing the drive signal based at least in part on the compensation signal in order to adjust a winding voltage of the secondary winding and to at least partially compensate for a change in a forward voltage of a rectifying diode associated with the secondary winding.

38. The method of claim 37 wherein the sampling a sensing signal includes:
sampling and holding the sensing signal;
providing a sampled-and-held signal;
receiving the sampled-and-held signal;
generating an output signal based at least in part on the sampled-and-held signal;
generating a second current based at least in part on the output signal; and
generating the compensation signal based at least in part on the second current.

39. The method of claim 37 wherein the outputting a drive signal based at least in part on the amplified signal to close or open a switch to affect the first current includes:
changing the drive signal based at least in part on the compensation signal in order to completely compensate for the change in the forward voltage of the rectifying diode.

* * * * *